July 25, 1944.  L. A. COLLINS  2,354,199
METHOD AND MEANS FOR TELEVISION AND OTHER TRANSMISSIONS
Filed Jan. 3, 1939  11 Sheets-Sheet 1
FIGURE I
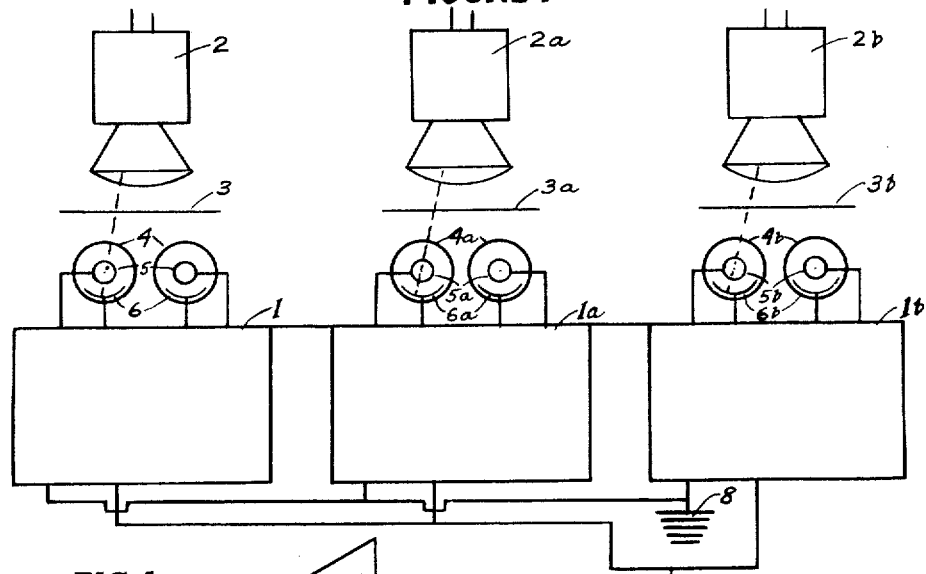
FIG. Ib
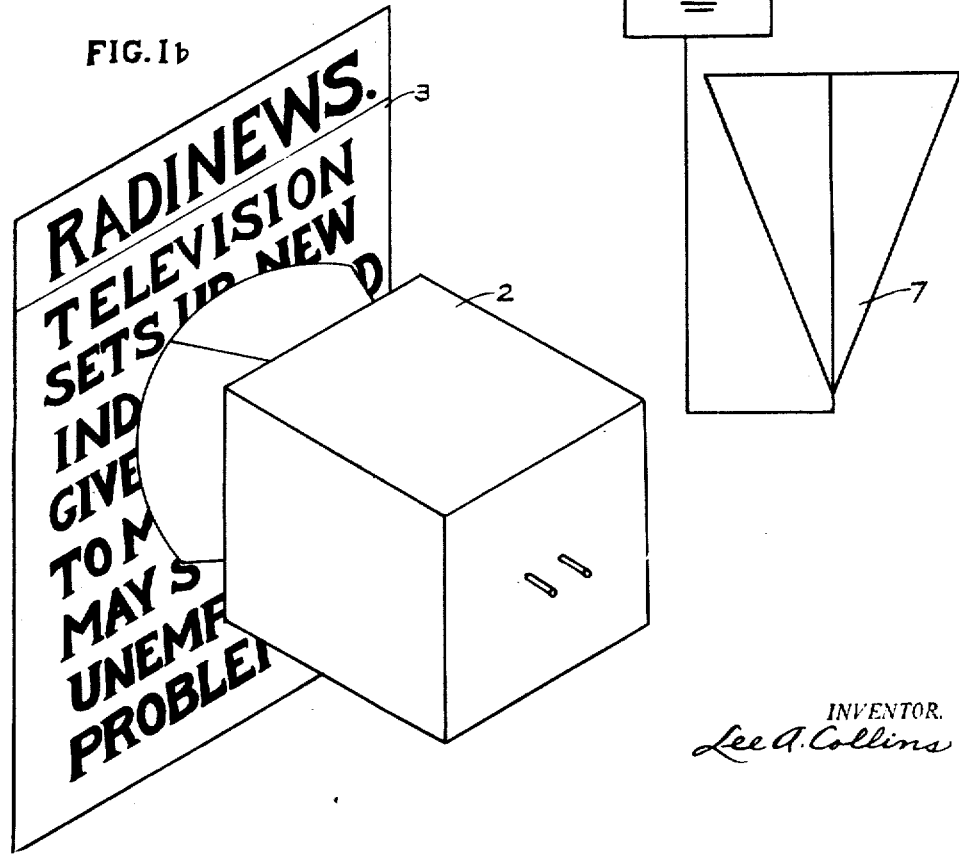
INVENTOR.
Lee A. Collins July 25, 1944. L. A. COLLINS 2,354,199
METHOD AND MEANS FOR TELEVISION AND OTHER TRANSMISSIONS
Filed Jan. 3, 1939 11 Sheets-Sheet 2
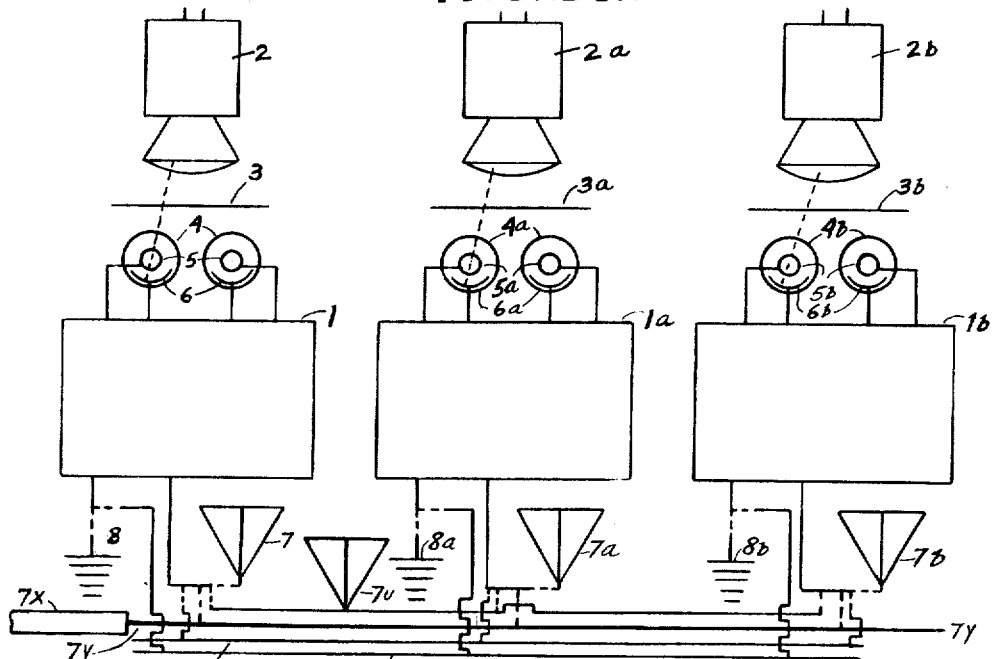
FIGURE 1a
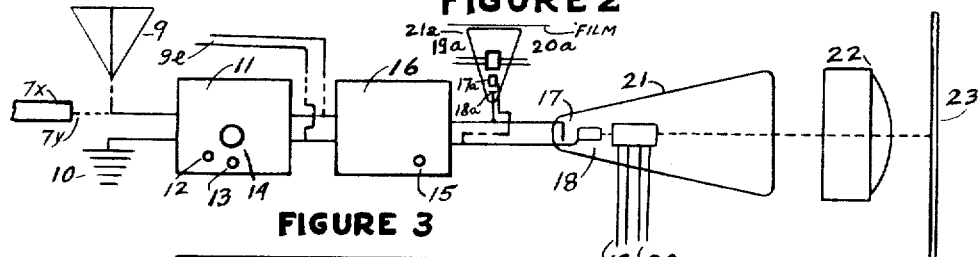
FIGURE 2
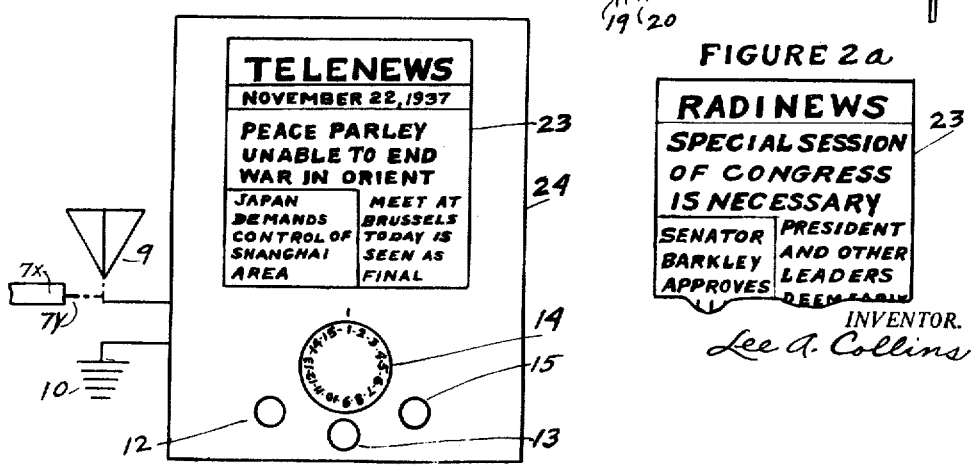
FIGURE 3
FIGURE 2a
INVENTOR.
Lee A. Collins July 25, 1944.  L. A. COLLINS  2,354,199
METHOD AND MEANS FOR TELEVISION AND OTHER TRANSMISSIONS
Filed Jan. 3, 1939  11 Sheets-Sheet 3

INVENTOR.
Lee A. Collins

July 25, 1944. L. A. COLLINS 2,354,199
METHOD AND MEANS FOR TELEVISION AND OTHER TRANSMISSIONS
Filed Jan. 3, 1939 11 Sheets-Sheet 4
FIGURE 7
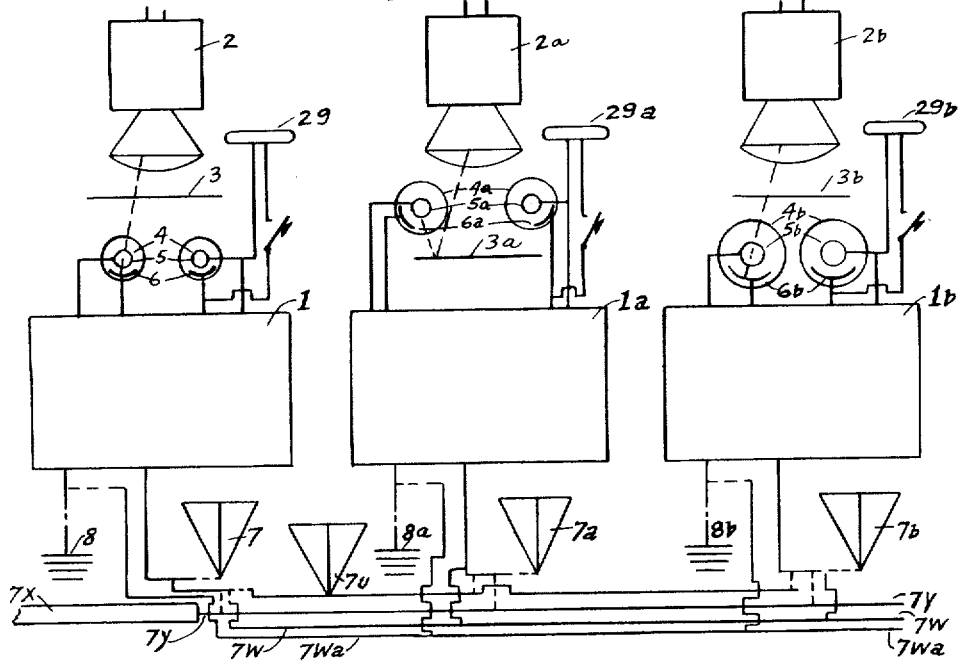
FIGURE 8
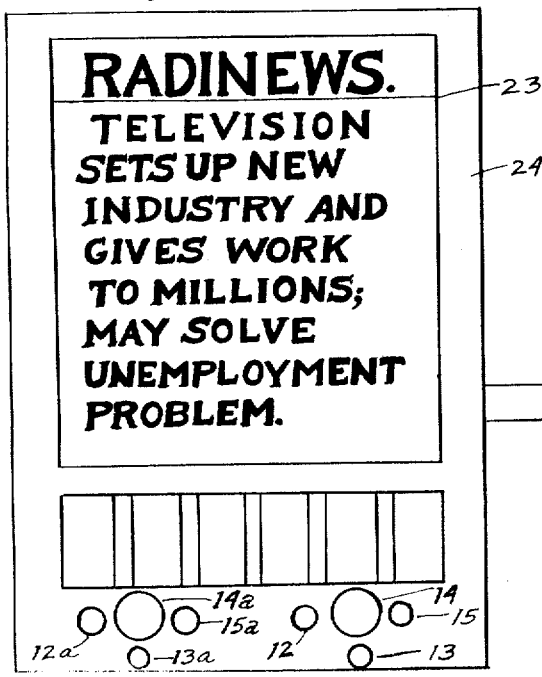
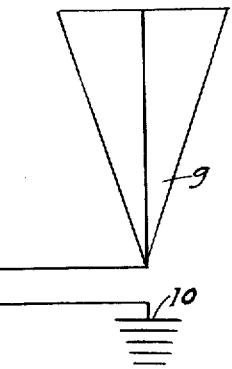
INVENTOR.
Lee A. Collins

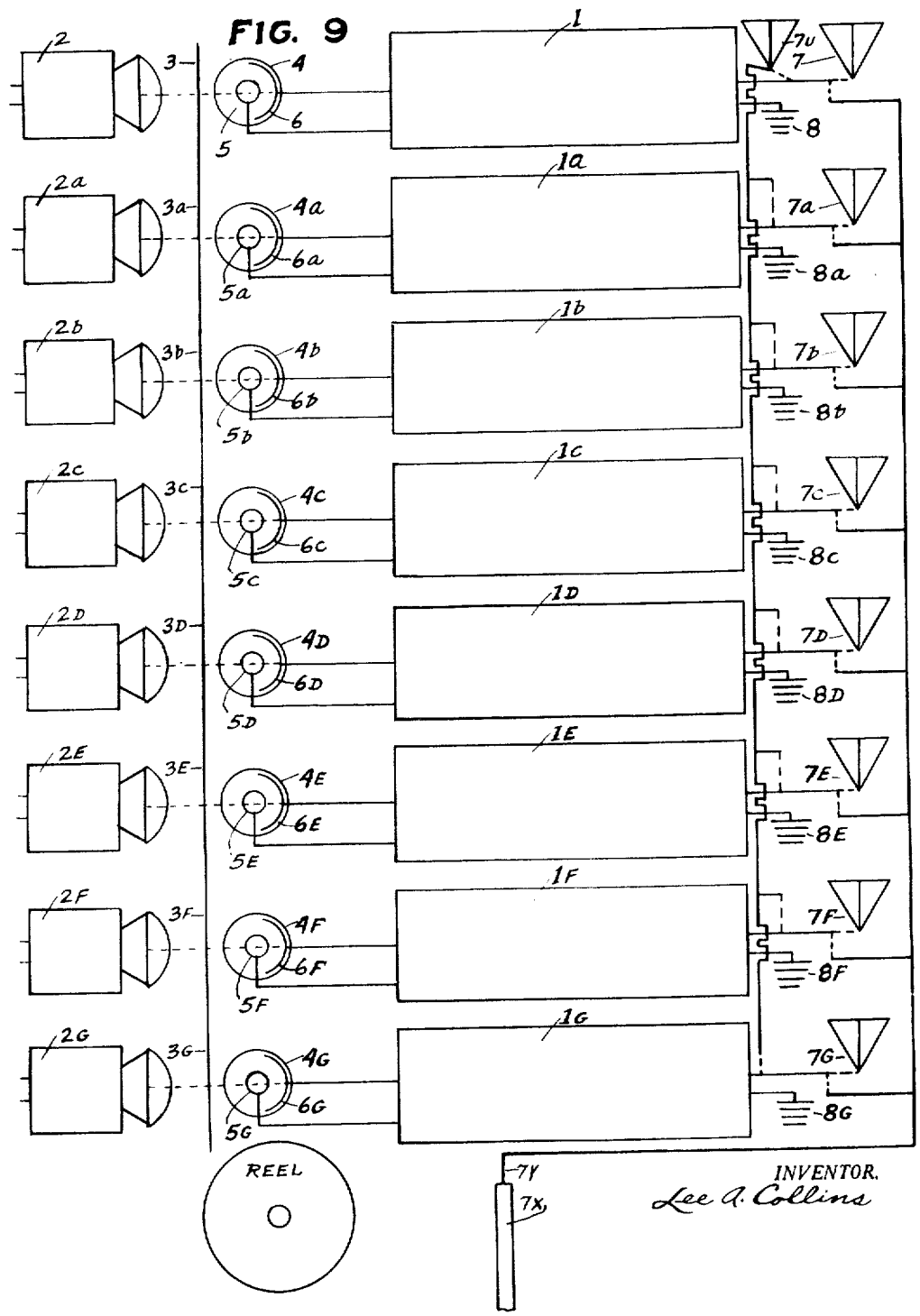

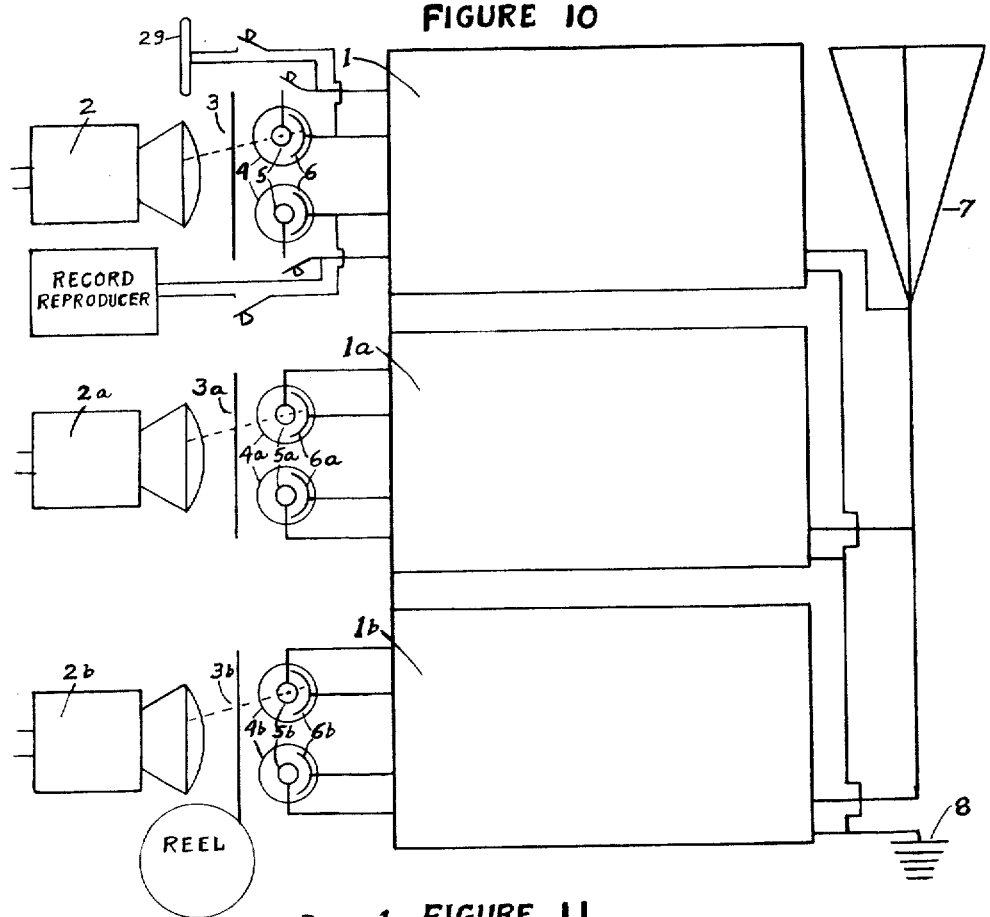
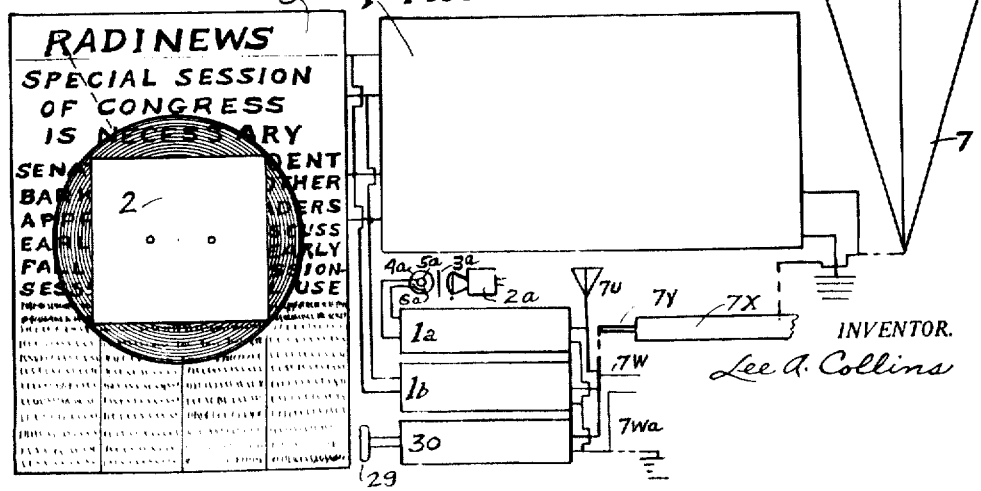

INVENTOR.
Lee A. Collins

INVENTOR.
Lee A. Collins

July 25, 1944.   L. A. COLLINS   2,354,199
METHOD AND MEANS FOR TELEVISION AND OTHER TRANSMISSIONS
Filed Jan. 3, 1939   11 Sheets-Sheet 9
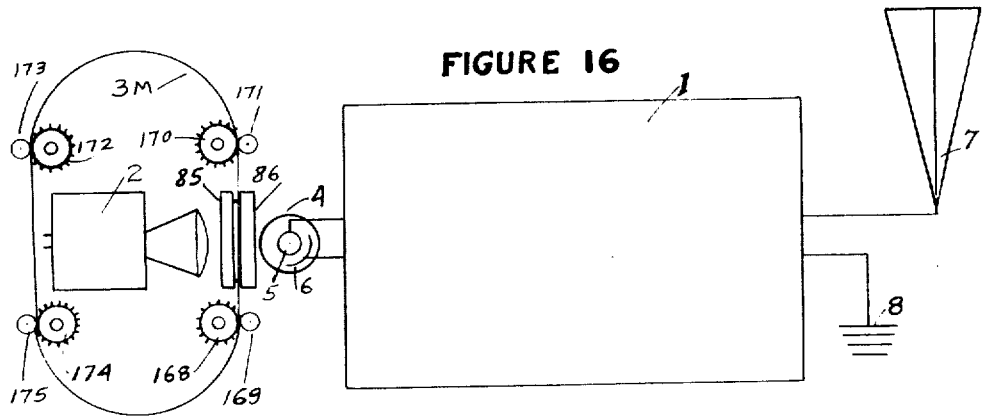
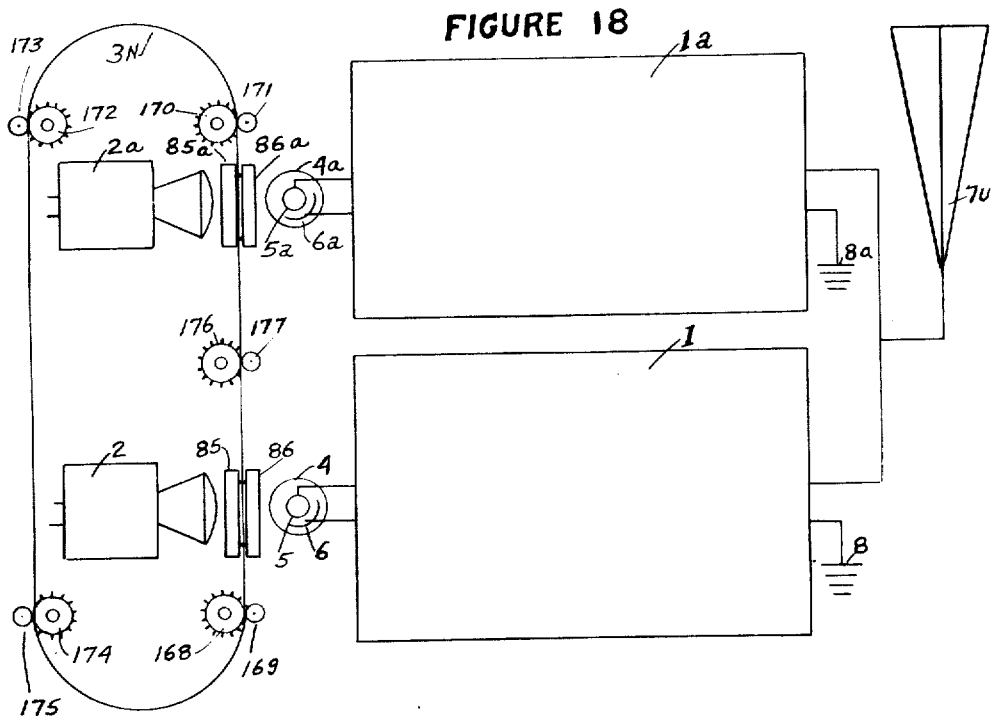
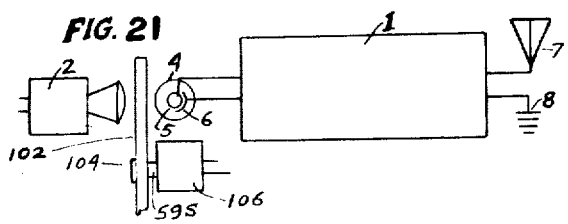
INVENTOR.
Lee A. Collins

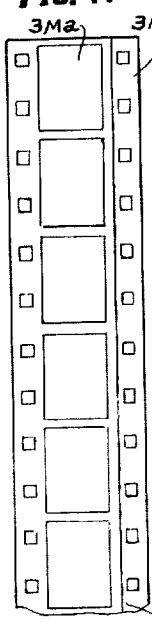
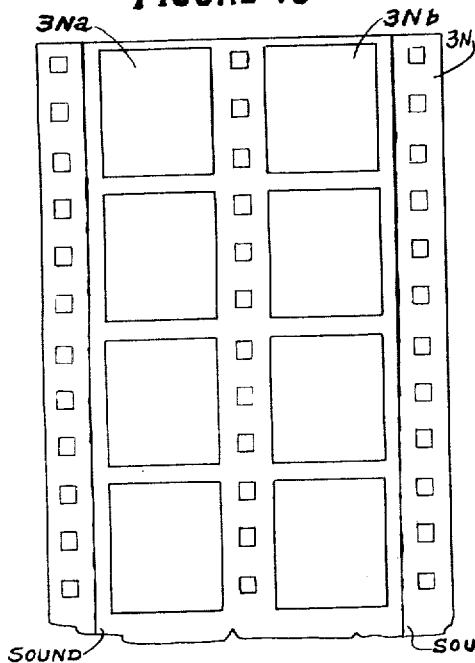
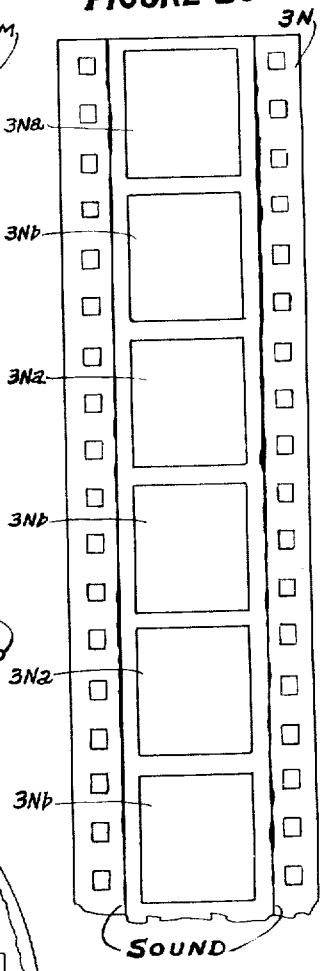
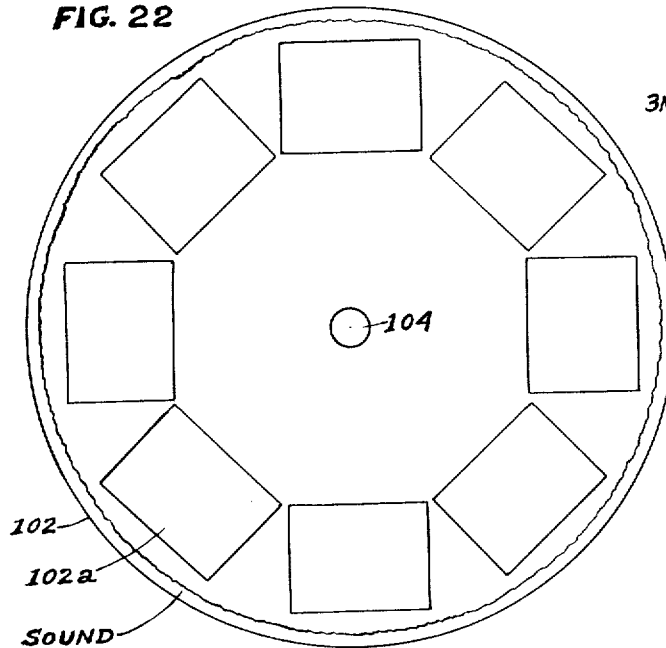
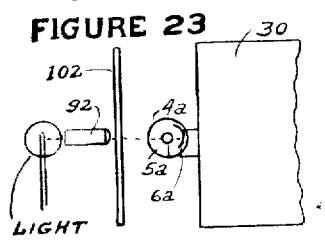

July 25, 1944.  L. A. COLLINS  2,354,199
METHOD AND MEANS FOR TELEVISION AND OTHER TRANSMISSIONS
Filed Jan. 3, 1939  11 Sheets-Sheet 11

INVENTOR.
Lee A. Collins

Patented July 25, 1944

2,354,199

UNITED STATES PATENT OFFICE 2,354,199

METHOD AND MEANS FOR TELEVISION
AND OTHER TRANSMISSIONS

Lee A. Collins, Louisville, Ky.

Application January 3, 1939, Serial No. 249,059

7 Claims. (Cl. 178—6)

My invention is for methods and means for sending and receiving television and sound together and separately.

Several methods and various types of apparatus for transmitting and receiving are described and shown for carrying out the spirit of my invention.

One object is to send separately two or more pages or proofs of a newspaper, magazine, and other assembled matter simultaneously and repeatedly by suitable apparatus for enabling the selecting and receiving of a page or more of interest at any time during the continuous transmitting sending period which may be for short or long periods of time, as may be chosen, it being optional to interrupt at times to enable changing the image matter in whole or in part to later news and other transmissions. Likewise, it includes sending and receiving of all kinds of image matter, objects, persons, scenes, acts, etc., either still or in motion.

Another object is to send two or more separate transmissions simultaneously without repeating for enabling selecting and receiving of either of the related transmissions.

Another object is for repeatedly sending over a single transmitting channel for desired periods of time for enabling receiving of the whole or a part thereof at any time during such sending periods.

Another object is for sending singly the different transmissions of separate groupings one after the other, repeatedly, over a single channel and by apparatus for enabling the selecting and receiving of one or more of the separate groupings at any time during the sending period.

Another object is to send two or more sets of successive transmissions simultaneously for enabling selecting and receiving of any one of the channels.

Another object is to send simultaneously by two or more different transmitting channels, each of which have separate groupings for sending successively, for enabling selecting and receiving of any one of the channels.

Another object is to send simultaneously and repeatedly by two or more transmitting channels, each of which send different programs successively, for enabling the selecting and receiving of one or more of the programs as desired.

Another object is to send recorded programs at each of the transmitting places when desired in lieu of other image and sound transmissions. Also, to send recorded programs at part of the transmitting places with other image or sound transmissions, or both.

Another object is to send recorded programs over a single transmitting channel repeatedly for enabling the selecting and receiving of the whole or parts thereof as desired.

Another object is to send successively over different channels with and without repeating in order to enable the selecting and receiving from one or more of the channels.

Heretofore, the disseminating of the contents of newspapers has been delayed many hours due to the time consumed in printing thousands of copies and by further delay in delivering them by the various means over city and country sections. The present invention eliminates these obstacles since the contents of newspapers may actually be received in homes and other places many hours before the printing can be finished. Furthermore, later news and pictures can be given than is now possible through the printing and delivery of newspapers. Therefore, the present invention ushers in a new era in the disseminating of news and other matter. Also, the simplicity of receiving apparatus makes possible low cost of operation which may even be less than the cost of a printed newspaper.

Under some circumstances it may be found desirable to send only part of the total number of pages in a newspaper, magazine, and other publications. Also, it may be found desirable to send only part of a complete assembly of other facsimile matter, objects, persons, etc. It is an intent to assemble these parts in any suitable arrangement. One example is to send excerpts from the entire pages. Another example is to send two or more of the complete pages. Also, it is an intent to send the excerpts and the entire pages with or without advertisements. In including advertisements with the excerpts they may be the same or different from those in the complete newspaper. Furthermore, the excerpts may contain therewith photographs, comics, and other reproductions.

All of my methods for sending images are applicable for sending sound separately, also, in combination with image sending.

It is optional to interrupt image and sound transmissions at any time for changing programs in whole or in part.

Many other objects and applications of my methods and apparatuses will be given in the accompanying drawings and description, and the scope of the invention will be defined in the claims.

By the terms "images," "views," and "objects" used throughout the description and in the claims, I intend to include all forms of printed pages, type, relief matter, drawings, comics, photographs, still pictures, moving pictures, scenes, objects, creatures, people, either still or in motion, acting, and all types of facsimile matter.

Referring to the accompanying drawings,

Figure 1 is a diagrammatic illustration of three television transmitting channels or stations sending separate facsimile sheets.

Figure 1a is a modification of Figure 1 having optional output carrying means.

Figure 1b is a perspective view of the scanner 2 of Figure 1 scanning a page of news.

Figure 2 is a diagrammatic illustration of a television receiving set for re-creating images sent by Figures 1 and 1a.

Figure 2a is a face view of part of the screen 23 of Figure 2.

Figure 3 is a face view of a receiving screen built in a cabinet housing a television receiving set.

Figure 5a is a modified arrangement of the mechanical receiving scanner aparatus.

Figure 5b is a face view of part of the screen 23 of Figure 5.

Figure 6a is a face view of part of the screen 23 of Figure 6.

Figure 7 shows combination television and sound transmitters.

Figure 8 is a face view of a cabinet housing television and sound receiving sets.

Figure 9 is a diagrammatic illustration of eight television sending sets sending eight different images on a single sheet or strip of material.

Figure 10 is a combination arrangement for image and sound sending.

Figure 11 is a combination arrangement for image and sound sending illustrating sending the same image over two channels simultaneously.

Figure 16 shows a single transmitting station for successively and repeatedly sending separate images on a film or other material.

Figure 17 shows a surface view of a film having sound recordings alongside of images.

Figure 18 shows two transmitting stations for simultaneously sending separate images registered on a single film or other material.

Figure 19 shows a surface view of a film having two separate sets of sound records and two sets of images.

Figure 20 shows a surface view of a film having two sound records alongside of a single row of separate images alternated along the running length of the film for giving greater length for the sound records.

Figure 21 shows an edge view of a disc in part view containing images for successively and repeatedly sending.

Figure 22 shows a surface view of the disc in Figure 21 with a sound record added.

Figure 23 is an edge view of the disc in Figure 22 with apparatus added for transmitting and re-creating the sound record.

Figure 4:
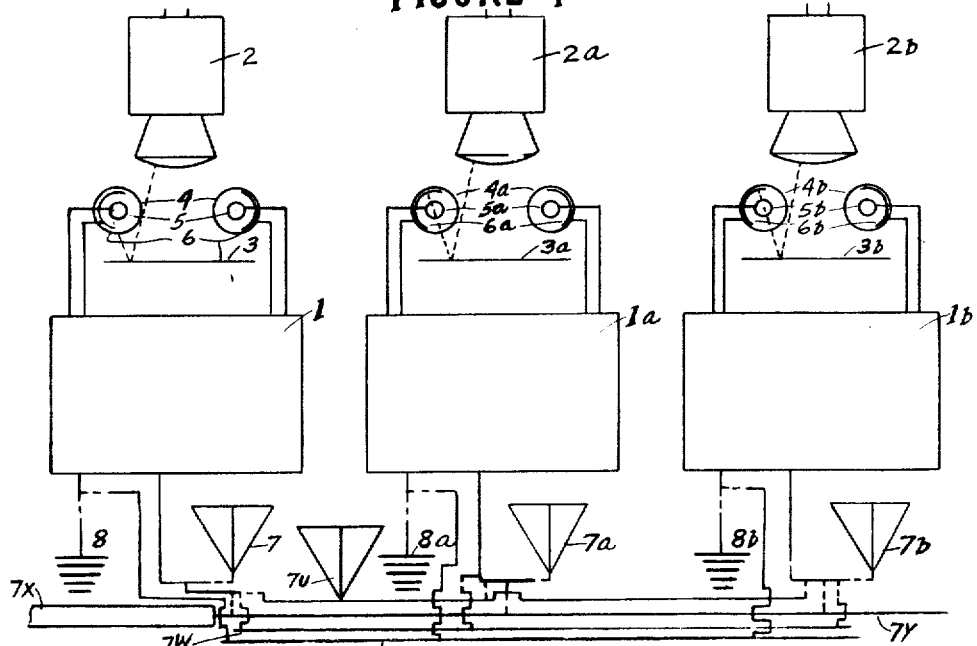
Figure 4 is a modification of Figure 1a for sending images by reflecting the scanning light rays therefrom.

Referring now more specifically to the drawings:

Figure 1 shows a group of three radio transmitting channels or stations indicated by the numerals 1, 1a, and 1b, it being understood that any desired number may be added, also, only two may be used, in order to conform to the number of images to be transmitted. The numerals 2, 2a, and 2b indicate light scanners of any suitable type giving uniform brilliancy for scanning the entire area of the images 3, 3a, and 3b, respectively, for projecting through the transparent or partially transparent material containing the images. The light rays reach the photo-electric cells 4, 4a, and 4b and cause varying amounts of electricity to flow between the rings and plates 5 and 6, 5a and 6a, and 5b and 6b, respectively, in exact accordance to the obstruction of the rays caused by the varying densities of the images. The electrical flow of the photo-electric cells 4, 4a, and 4b is passed through the wirings to the transmitters 1, 1a and 1b, respectively, for modulating the carrier waves, or otherwise causing variable radio frequency current transmissions. The aerial 7 and ground 8 are shown connected to the outputs of each of the transmitters 1, 1a, and 1b. The three sending scanners 2, 2a, and 2b will, when in operation, cause images of the three proofs or pages 3, 3a, and 3b, respectively, to be sent simultaneously over the three transmitters 1, 1a, 1b, respectively, and each transmitter will have a different wave length to enable tuning each separately at a receiving station. Furthermore, the transmissions take place, preferably, for a lengthy period of time continuously to enable receiving at various times to suit the convenience of all. Interruption may take place at times to enable replacing the proofs or pages with later news and other matter. Also, the number of transmitting channels being used may be decreased and increased after the sending period is commenced. Again, different matter may be substituted for any one of the sending channels, one example being a person opposite one of the senders for illustrating matter being sent. In the latter case the scanner is positioned for enabling reflecting the light rays from the person onto the photo-electric cells as will be shown in some of the other drawings setting forth several other methods of using.

Figure 1a is the same as Figure 1 except each of the output wires from the transmitters are shown disconnected from the aerial and ground by the dotted lines. In addition to a common aerial and ground, separate aerials 7, 7a, and 7b, and grounds 8, 8a, and 8b are shown. A common aerial is indicated in this figure by 7u, but it is shown in broken connection by dotted lines. Also, there is shown wires 7w and 7wa for use in lieu of an aerial and ground and connection will be made as indicated by the dotted lines extending therefrom.

A still further carrying channel is a co-axial cable 7x having an inside wire or other metal 7y for conducting or guiding the output from each of the transmitting channels. The metal carrier 7y may be solid or it may be a hollow tubing. Air space is provided between the outside cable 7x and the carrier 7y in a preferred arrangement, but a vacuum space may also be used for a more effective transmission channel. Suitable arrangement is made for holding the carrier 7y in uniform position inside the cable. Under certain conditions it is possible to use a filling material of suitable kind between the cable 7x and the carrier 7y. Either of the several means of carrying the transmissions may be used separately by one or more of the transmitting channels, or they may all be used simultaneously for sending to various points. Furthermore, all of the transmitting channels may use any one of the carrying means in common connection thereto. Also, any suitable combination of uses may be made to meet conditions in transmitting or sending images. The carrier inside of a co-axial cable has particular advantage, as is well known, in sending more than one channel at the same time due to the shielding action of the outside cable and is preferred to other types of metallic carriers. In some uses cables having more than one carrying wire or other metallic carrying means therein may be used. Therefore, the invention is not limited to any particular type of transmitters and sending carriers. Neither is it limited to any particular type of aerial and ground connections when purely radio transmissions are desired through space. Also, it is an intent to make such transmissions without ground connections, and in some cases without aerial connection when unnecessary and when impossible, such as to and from airplanes and other moving apparatuses. In the case of airplanes, it may be found advisable to send by airplane transmitters news and other matter such as photographs, in order to receive at stations on land, sea, and other airplanes in addition to such reception by airplanes from land transmitting stations of the present invention. The same is applicable to ships at sea.

Figure 1b is a perspective view of the scanner 2 and news page or proof 3 of the transmitting channel 1 of Figure 1.

Figure 2 shows a radio frequency stage 11 which has a current control knob 12, tuning knob 13, and tuning dial 14 for tuning in a receiving station or channel and then passing its output or modulations to an audio stage 16 by means of two connections. The audio stage 16 has output connections to the cathode 17 and anode 18 of a cathode ray tube indicated in general by the numeral 21. This cathode ray receiving tube has the usual four oscillating plates but only one shows in this side view illustration. Leads 19 connect singly to one set of two plates arranged parallel to each and spaced apart while leads 20 connect in like manner to another set of two plates arranged parallel to each and spaced apart but at right angle to the first set of plates. An oscillating current of a given frequency is applied to the plates connected to leads 19 and another oscillating current of a higher or lower frequency is applied to the plates connected to the leads 20. A stream of light rays shoot from the anode 18, between the two sets of plates joined to the leads 19 and 20 and then to the end of the tube to an optical system 22 for projecting onto the screen 23. The oscillating currents imposed on the two sets of plates of the leads 19 and 20 cause the beam of light to sweep in vertical and horizontal planes for causing complete area scanning in the well known manner. The current passing from the amplifier 16 is in variable degrees in exact accordance to the current flow from the radio frequency stage 11 and the cathode and anode of the cathode ray tube 21 set up varying discharges of light ray emissions in exact accordance, in a well known manner. It is to be understood that other types of cathode ray tubes may be used. Also, any other type of receiving scanners and light variable means for producing images in accordance to those sent by transmitters. The aerial 9, or lead 7y from the co-axial cable 7x transmits the radio waves and their modulations from transmitting stations to the radio frequency stage 11 and tuning is accomplished by turning the knob 13 to the point for bringing in the station desired. In lieu of the aerial, co-axial cable, and ground, wired connection may be made from the circuit leads 7w and 7wa of the transmitting channels to the input of the radio frequency receiver 11. Also, whenever desired, an audio current source leading from an audio output of a television sending channel may connect to the audio stage 16, thus eliminating the use of the radio frequency stage 11, as shown by the leads 9l and broken connections indicated by the dotted lines. It will also be understood that receiving may take place from various groups of transmitters at different locations by turning the dial of the radio frequency stage 11. Furthermore, the sending channels of any one group may be separated any distance desired. Also, the wired circuits leading direct to the audio stage 16 may be from any number of stations and at various points in various assemblies.

Assuming that forty different pages of a newspaper or other publication are being transmitted simultaneously by a grouping of forty sending channels, in carrying out the methods of Figures 1 and 1a, each of which have a different wave length, then the transmitter 1 may send page 1 and be assigned any given wave length. For convenience in illustrating, page 1 sent by the transmitting channel may be indicated by numeral 1 affixed on the dial 14 of Figure 2, while the other pages will bear numerals 2 to 40, respectively, affixed on the dial. It will be understood that the wave lengths of the different sending channels may be of any suitable assignment, and the numerals on the receiving dial 14 may be in any suitable arrangement and they may also bear numerals indicating the wave lengths in lieu of the page numbers. By dialing the entire sending range on the dial 14 it is easy to determine just which page or image of the group of transmissions is of special interest and then keep the dial at rest and increase the receiving current volume, or decrease it, by moving the knobs 12 and 15, if not already properly adjusted. After viewing of the image on the screen 23 the tuning dial may be moved to another point for viewing another page or other image, and so on, until any desired part of, or the entire group being transmitted is viewed. The viewing screen 23 may be of any desired size and positioned at any desired distance from the receiving tube 21 and the optical system 22, depending on the size and actinic power of the receiving tube. The optical system and the receiving screen 23 may be omitted and a ground glass effect made on the end of the receiving tube 21 by applying a coating of a suitable mixture, as is well understood, and the images viewed on it. Also, the end of the tube may be ground for forming a screen thereon.

If desired, more than one cathode ray receiving tube may be connected to the output of the amplifier 16 when a number of people view the received images, and each tube will be provided with a receiving screen on its end, or separate, as described. These added tubes may be in the same room or at scattered locations in a building, or elsewhere. Also, an added cathode ray tube 21a may be joined to the output leads of the amplifier 16 as indicated by the dotted lines for registering the images received on a photographic film. The necessary apparatus is provided for moving the film at the proper speed, either continuously or intermittingly at each image finish. Furthermore, other types of scanning receivers may be used for connection with the output leads of the amplifier 16.

Figure 2a shows in part a face view of the screen 23 of Figure 2.

Figure 3 shows a front view of a cabinet which houses all of the apparatus shown in Figure 2, and the dial and control knobs are shown below the receiving screen bearing news images.

Figure 4 is a modification of Figure 1a for reflecting the scanning light from the pages 3, 3a, and 3b, onto the photo-electric cells 4, 4a and 4b, respectively. This arrangement is desirable when the images being transmitted are on both sides of a page, or when objects of various kinds are transmitted. The apparatus is identically the same as in Figure 1a except the arrangement of the images or objects being transmitted. When images or objects are to be sent simultaneously from more than one side or surface, then the photo-electric cells will be in alignment for receiving the reflections from both surfaces, or several sides or surfaces if another kind of transmission is being made. One example in carrying out this plan in reference to Figure 4 and the transmission of pages printed on two sides is to extend the photo-electric cells 4a on the opposite side of the image page 3 and in like manner and relative arrangement position the scanner 2a on the opposite side of the image page 3, as it is now positioned in the drawing 4. In carrying out this arrangement it is necessary to extend the wiring, but in no way change any of the circuits or structure of the apparatus. In the case of sending an object having more than two sides, then the same arrangement will be made with four sets of scanners and photo-electric cells, assuming a four sided object is being sent simultaneously. It is not an intent to limit the number of sides or surfaces in simultaneous transmissions and it will be understood that many combinations may be made in using my invention for various purposes. The apparatuses and circuits in Figure 1a and Figure 4 are identical, the difference being in the arrangement of the images or objects for transmission.

Figure 5:
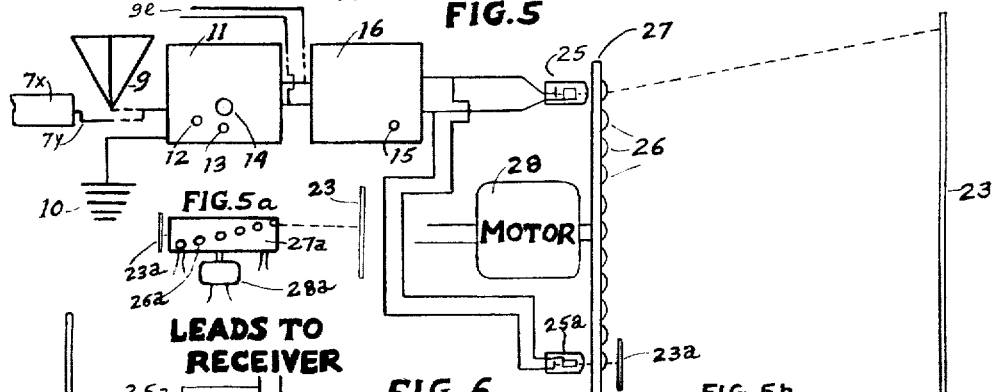
Figure 5 is a diagrammatic illustration of a mechanical disc receiving set for television.

Figure 5 shows the same receiving radio set as shown in Figure 2 with the audio amplifier leads connected to a glow lamp 25 and another glow lamp 25a, in lieu of the cathode ray receiving tubes in Figure 2. The glow lamps pass their light through one or more spirals of lenses 26, studded on the disc 27 which is shown in edge view and driven by a motor 28 which is synchronized with the transmitting scanners in one of several well known ways. The light rays pass from the glow lamp 25 and the lenses 27 project and form the component parts of the images onto a suitable screen or ground glass 23 in a well known way. The glow lamp 25a passes its light rays onto a sensitized film 23a for registering photographically, and the film is moved along at uniform or intermittent speed by suitable mechanism in carrying out the several well known methods used in photographing television images.

Figure 5a is a modification of the lens disc in Figure 5 showing the lenses arranged in spiral formation along the edge of a drum 27a. The glow lamps are the same as in Figure 5 and they are arranged inside of the drum with their wiring connections shown extending from the under or open space of the drum for leading to an amplifier output such as shown in Figure 5 and coupled to a radio frequency stage when reception is from radio transmitting channels. The results obtained will be like obtained in Figure 5.

Figure 5b shows a face view of the screen 23 of Figure 5, in part, for illustrating how facsimile matter will appear thereon. The screen may be included in a cabinet which may also include the receiving set and apparatus in Figure 5, or Figure 5a, as shown in Figure 3. Also, when desired, the screen 23 and other screens in the several drawings may be provided with a suitable hood to shield the images received thereon from extraneous light at the place of viewing. Also, if desired, the screens may be on a sliding frame or other structure for varying the distance from the receiving apparatus for giving images of various sizes. Furthermore, the structure holding the frame may be adjustable in a vertical position to enable giving a full view or a part view of the matter received, and it has particular value in magnifying small images by proper adjustment in closer range to the receiving apparatus, as will be understood by those skilled in the optical art. Additional optical systems may be added for further magnifying the images received.

Figure 6:
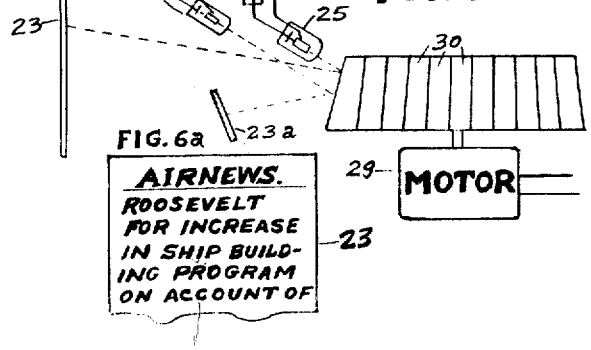
Figure 6 is a side view of a drum for revolving mirrors in varying elevations for scanning images onto a receiving screen and photographic materials.

Figure 6 shows a side view of a scanning drum having a group of mirrors 30 arranged at varying elevations around the edge thereof for reflecting light rays after projection from the glow lamps 25 and 25a. The reflections from the glow lamp 25 reach the screen 23, and the reflections from glow lamp 25a reach the sensitized film 23a for registering images as described in reference to Figure 5. Lenses, or optical systems, may be interposed between the mirror drum and the screen, and the sensitized film; or, lenses may be interposed between the glow lamps and the mirror drum; also, they may be used in both positions simultaneously for improving the images.

Figure 6a shows a face view of the screen 23 of Figure 6 in part view.

The same receiving methods may be carried out in Figures 5, 5a and 6. Also, additional glow lamps and receiving screens may be added to each of the three figures for connecting to a single amplifier output of each figure in order to show any desired number of the same images received in each figure. This has advantage when a group of people find it difficult to view a single receiving screen. Furthermore, the separate screens may be distributed at various points. By means of extending the wiring to a cathode ray receiving tube it is possible to still further increase the number of receiving points and increase the uses. In receiving by the three types of mechanical scanners in these figures it is possible to make larger views on the receiving screen than is possible with the ordinary home size cathode-ray receiving tube; therefore, it has in certain fields of usage been proven advantageous to use purely mechanical scanning apparatus. However, it is an intent to use any suitable type of scanning apparatus in carrying out the receiving methods set forth in this description and illustrated in the several drawings. Furthermore, any desired number of the cathode-ray receiving tubes may be added to the same receiving set of either of the mechanical sets for various combinations and uses, among which is distributing the cathode ray receiving tubes singly in rooms throughout a building for separate reception of views while the mechanical type of receiving scanner is used in showing the received images to a group of people as in halls, theaters and the like. Sound effects may be included at the point of reception for supplementing the images when found advantageous. Also, sound effects may be included with the images sent from the distant points simultaneously in order to supplement the received images when found desirable, and such combinations will be disclosed in the following description and drawings. A still further modification may be made in receiving several images simultaneously by the mechanical scanners by adding mirrors between the scanners and the screens in various angles to reflect the light rays to a group of screens at various receiving angles. Also, it is possible to photographically register more than one image in the use of a single mechanical scanner. Many other combinations are possible and will occur to those skilled in the art in carrying out the methods of the present invention.

Figure 7 shows three image sending channels with microphones 29, 29a, and 29b for each of the channels 1, 1a, and 1b, respectively. These microphones have circuits to the inputs of transmitting channels but they are shown in broken connection by a switch in each of the circuits. In using one of the sound transmitters it is important that the scanning light be excluded from the photo-electric cells by some shielding or shutter apparatus, not shown, or by breaking the circuits of each by suitable switches for manual or automatic control as will be understood. Also, the two photo-electric cells of each of the transmitting channels 1, 1a and 1b may have switches in the circuits for throwing when the sound microphones are in use. The sound being sent will relate to one or more of the transmitting stations in the group sending images, or the sound may pertain to the image just sent over its channel; also, the sound may pertain to an image that will be sent over its channel, and an example is calling attention to some particular part of the image view or facsimile. Other uses will occur to operators and it is not intended for this use alone. Sound reproducing apparatuses may be used by connecting in circuit in lieu of the microphones 29, 29a and 29b; also, the microphones and sound record reproducers may be used in parallel circuit for a combination use of both. It will be understood that sound record reproducing apparatus may be used with one or more of the transmitting channels. Likewise, the microphones may be used on one or more of the transmitting channels. Still another use of my system is to use one of the transmitting channels for musical transmitting when not in use for image transmissions. Also, more than one channel may be used for musical and other sound transmissions and they may accompany image transmissions, or they may be purely sound transmissions without images accompanying them. Many uses will occur for my combination image and sound transmitting channels. The output of each of the transmitting channels 1, 1a, and 1b may be used with carrying channels shown which are identical to carrying channels in Figures 1a and 4.

Figure 8 shows a combined image and sound receiving set having a built-in screen 23 in a cabinet 24, as in Figure 3, with the sound outlet from a receiving set, shown below the receiving screen 23. The tuning dial and knobs for the image receiver are indicated by the same reference numerals as in Figure 3. The tuning dial for the sound receiver with the control knobs associated bear the same numerals, respectively, with the letter $a$ added to each. The image receiving apparatus in the cabinet 24 of Figure 8 may be the same as in Figure 3, or it may be one of the mechanical type receiving apparatuses shown in Figures 5, 5a, and 6. Also, the receiving apparatus may be of any other known type and its circuits and the sound receiving circuits may be of any kind. An aerial 9 and ground 10 is shown for combination use for receiving image and sound signals from a radio transmitter, but each set may have separate aerials and grounds. Also, the co-axial cable, or other wired circuits may be used as shown in the various drawings.

Figure 9 is a modification of the transmitting methods for sending different images on a single sheet of paper, film, glass or other material. Transmitting channels 1, 1a, 1b, 1c, 1d, 1e, 1f and 1g have single photo-electric cells, 5, 5a, 5b, 5c, 5d, 5e, 5f, and 5g, respectively, for receiving light rays from the scanners 2, 2a, 2b, 2c, 2d, 2e, 2f, and 2g after passing through the image sections, 3, 3a, 3b, 3c, 3d, 3e, 3f, and 3g, respectively, to to each. The output of each of the transmitting channels have separate aerials 7, 7a, 7b, 7c, 7d, 7e, 7f, and 7g and separate grounds 8, 8a, 8b, 8c, 8d, 8e, 8f and 8g, respectively. Also, a common aerial 7u, is shown, and a co-axial cable. Each of the transmission output carrying channels may be used in the several ways set forth in reference to the Figures 1a, 4, and 7. Also, two wired connections may be used in lieu of an aerial and ground, but they are omitted in these drawings. In these drawings each of the image groups on the material between the scanners and the photo-electric cells may be separate columns of news in an eight column news-proof; also, each of the image groups may be full-sized news-proofs printed on the single sheet of material.

Assuming that each group represents a column of printed matter in a news-page of a newspaper or other publication, then each transmitting channel sends only a column width of matter in lieu of a full page.

Reception at a receiving station will be larger on the receiving screen than it would be if a full page were received, that is, if the focusing of the lens and receiving screen is unchanged. Even though the focusing is changed the reception on a receiving screen of a single column is better than a full page of 8-column width since the scanning light will scan it more effectively. In lieu of projecting the scanning light rays through the material containing the images, the light may be scanned on the images and then reflected onto the photo-electric cells as shown in Figure 4, using either one or more of the photo-electric cells for each image. A reel is shown for holding the material containing the images when in great length; also, when more than one set of the eight images are on the material for sending by passing along opposite the scanning lights after a reasonable period of time to give scanning of the next eight columns, or eight pages. Suitable mechanism may be added to move the image bearing material at proper timing, one such mechanism being an intermitting moving picture machine parts driven at slow speed by a motor and worm drive shafting. Sprocket wheels and rollers, or plain rollers, will be rotated by the mechanism for engaging with the image bearing material whether it is of photographic film bearing photographic images, or paper or other material having printed matter and the like thereon. A take-up reel may be added when a large roll is used. The method is not limited to the exact number of sending channels and the columns or pages being sent; either a greater or lesser number of channels and images may be used. Furthermore, in the sending of part of a news-page proof or other facsimile by each of the scanners and channels, it may be desirable to send two columns by each, or any other division or part thereof. In the use of a photographic film containing printed page reproductions or other facsimiles, the method will include the sending of both negative and positive films, the one used depending on the type of receiving sets in use and the purpose thereof, as will be understood by those skilled in the television art. This method of using negative or positive film in sending is also applicable to the other sending channels shown in the several drawings. Also, printed and other facsimile materials may be in reversed order for sending, when desired, for certain types of receivers.

As before stated, various combinations may be made in my methods and apparatuses, and in Figure 10 I have chosen to show the transmitters, aerial, and ground system of Figure 1 with the subject matter at transmitters 1a and 1c changed. It will be understood that the wired transmission system shown in Figure 1a may be used in lieu of the aerial and ground. A microphone 29 and record reproducing apparatus are added to the input of the transmitter 1; broken circuits are shown for the photo-electric cell, microphone and record reproducing apparatus for closing individually for the kind of transmissions chosen. The facsimile 3 may be comics and the microphone may be used before or after transmitting them; the record reproducing apparatus may have such recordings made in advance for use in lieu of the microphone. The facsimile 3a of transmitter 1a may be a newspage; facsimile 3b on the reel at transmitter 1b may be a series of newspages and it is moved along by suitable rotating apparatus at desired speeds, preferably intermitting at each facsimile thereon and with or without a shutter for cutting off the images during the movement of the facsimiles as in moving picture machine apparatus, and such apparatus may be used. The facsimile strip or film 3b may have sound records thereon alongside the images, or they may be on the opposite side thereof; also, the sounds may be superimposed on the images. The reproduction of the sounds may take place in any of the well known methods and by suitable apparatus and then be transmitted through the microphone 29 of the transmitter 1 of Figure 10; also, the sounds may be translated into light variations the same as the images and transmitted by a separate sending channel; when the sounds are mechanical recordings they will be translated into current changes for transmitting by the well known electric pick-up or magnetic pick-up and the transmissions may be through the microphone after recreating through a sound reproducer, or the transmissions may be direct to a sending channel without the reproducer and microphone in a manner well understood. When similar rotating apparatus or intermitting apparatus is used at a receiving station as at the transmitting station images and sounds may be recorded; also, they may be a combination viewing and recording as described in reference to Figure 2 for images, or they may be received solely for viewing with or without the sounds. It will be understood that other kinds of facsimile may be sent, also, objects and the like in this grouping; furthermore, a greater number of any one kind of the grouping may be used.

Figure 11 shows a surface view of a newspage 3 with a rear end view of the scanner 2, such as shown in several of the drawings in side view. The usual wiring from the two photo-electric cells behind the newspage lead to transmitter 1 and also to the transmitter 1b for rendering the same image currents to each of the channels simultaneously; the transmitter 1 may be sending over long wave length and the transmitter 1b over short wave length. Transmitter 1a has a still different wave length and is shown sending a facsimile page 3a which is different from the facsimile 3 of transmitters 1 and 1b. The transmitter 30 shows a sound microphone but it may also include record reproducers and switching apparatus as shown at station 1 of Figure 10. It will be understood that aerial and ground outputs may be used, or wired circuits separate or in combination.

Figure 12:
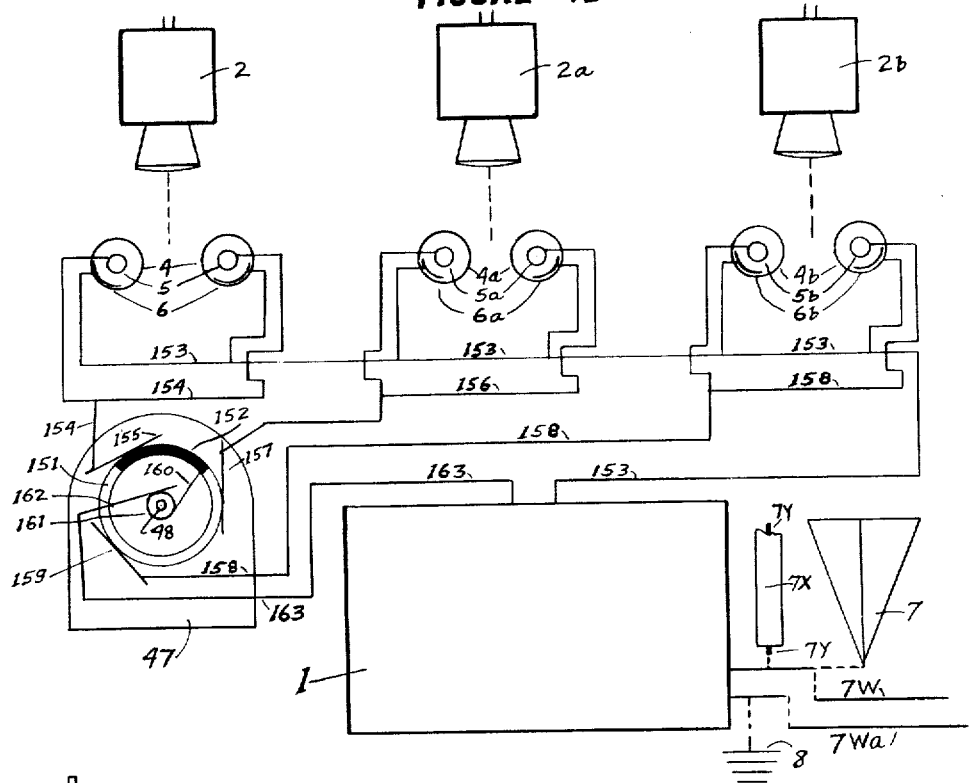
Figure 12 shows a single transmitting station with apparatus for successively and repeatedly sending three separate sets of images or objects.

Figure 12 shows three scanning units for sending images one after the other over a single transmitting channel by the making and breaking of their circuits to the transmitter by a rotating disc 151 having a metallic segment indicated by the numeral 152. The rotating disc 151 is mounted on a shaft 48 of a rotating apparatus 47 such as described in reference to Figures 17 and 18. The wiring 153 is joined to each of the light sensitive elements 6, 6a, and 6b of photo-electric cells 4, 4a and 4b, respectively, of the three scanning units and leads to the input of transmitter 1; the wiring 154 joins the two ring elements 5 of photo-electric cells 4 and leads to a flat spring brush 155 engaging the disc 151; the wiring 156 joins the two-ring elements 5a of photo-electric cells 4a and leads to a flat spring brush 157 engaging the disc 151; the wiring 158 joins the two ring elements 5b of photo-electric cells 4b and leads to a flat spring brush 159 engaging the disc 151. The metallic piece 152 seated in the insulated disc 151 is joined by the metallic piece 160 to a metallic disc 161 mounted on the shaft 48; the disc 161 is preferably insulated in mounting on the shaft 48. The brush 162 engages the disc 161 for completing a circuit through wiring 163 to transmitter 1 from the photo-electric cells of each of the three scanning units 2, 2a and 2b in consecutive order as the disc 151 and 161 rotate in regular timing. In the position of the disc 151 of the present drawing a circuit is completed to the input of transmitter 1 from the photo-electric cells 4 of the first scanning unit. When the disc 151 rotates farther the segment 152 will come in contact with brush 157 and complete a circuit from the photo-electric cells 4a of the center scanning unit to the transmitter 1, and on still further rotation the segment 152 contacts the brush 159 and completes a circuit from the photo-electric cells 4b of the third scanning unit to the transmitter 1. The length of the metallic segment 152 is made to contact only one brush at a time and preferably to avoid as little delay as possible between the contacts when reception is on a visible screen at a receiving station. However, it is possible to lengthen the segment 152 just enough to cause two brushes to contact it for a brief period in order to impose a stronger current flow on the input of the transmitter 1 for actuating registering apparatus at receivers. This simplified method and apparatus for transmitting and receiving various images takes into recognition the fact that the eye retains images several seconds after they are seen, and an example is in the viewing of moving pictures having one or more picture frames missing due to tearing and patching and which are not detected at all due to the speed and number of pictures shown per second. Any desired number of the scanning units may be used, but a great number will cause too much delay between images and be detected when viewed at a receiving screen separately.

Figure 13:
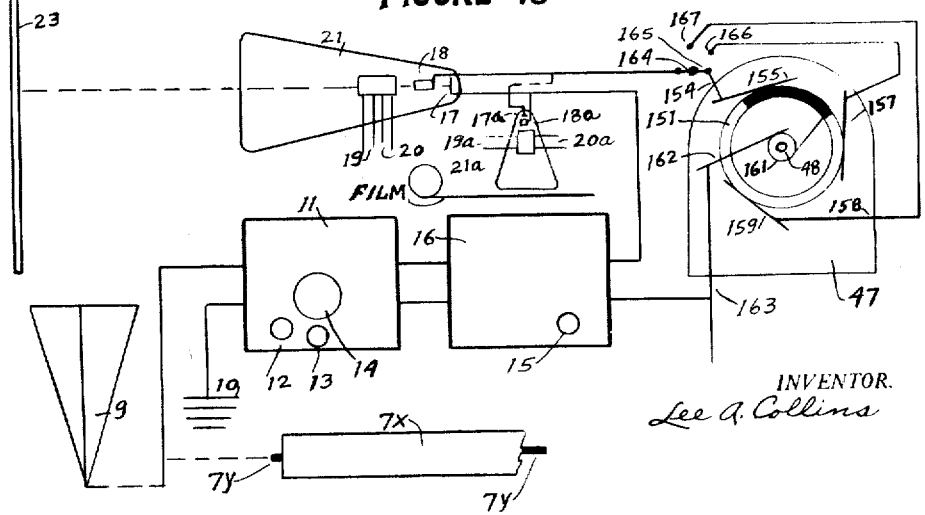
Figure 13 shows a receiving set with apparatus for receiving separately the images from the grouping in Figure 12.

Figure 13 shows the receiving set and apparatus shown in Figure 2 with one of the output wires from the audio stage having circuit through a rotating circuit control apparatus 47, the same as shown in Figure 12, for making and breaking the audio output current to the cathode ray tube 21 in like manner to controlling the circuits in Figure 12. Switch 164 is shown in circuit with wiring 154 of the brush 155 for receiving images being sent from the photoelectric cells 4 of the first scanning unit of Figure 12; moving the switch 164 to wiring contact 166 will cause the receiving of images from photo-electric cells 4a of the center scanning unit 2a of Figure 12; moving the switch 164 to wiring contact 167 will cause receiving of images from photo-electric cells 4b of scanner 2b of Figure 12. It will be understood that other types of television receiving apparatuses may be used with the rotating selector in one of its circuits. Also, the rotating selector may be in any other circuit of the receiving apparatus than the output shown in Figure 13.

Figure 14:
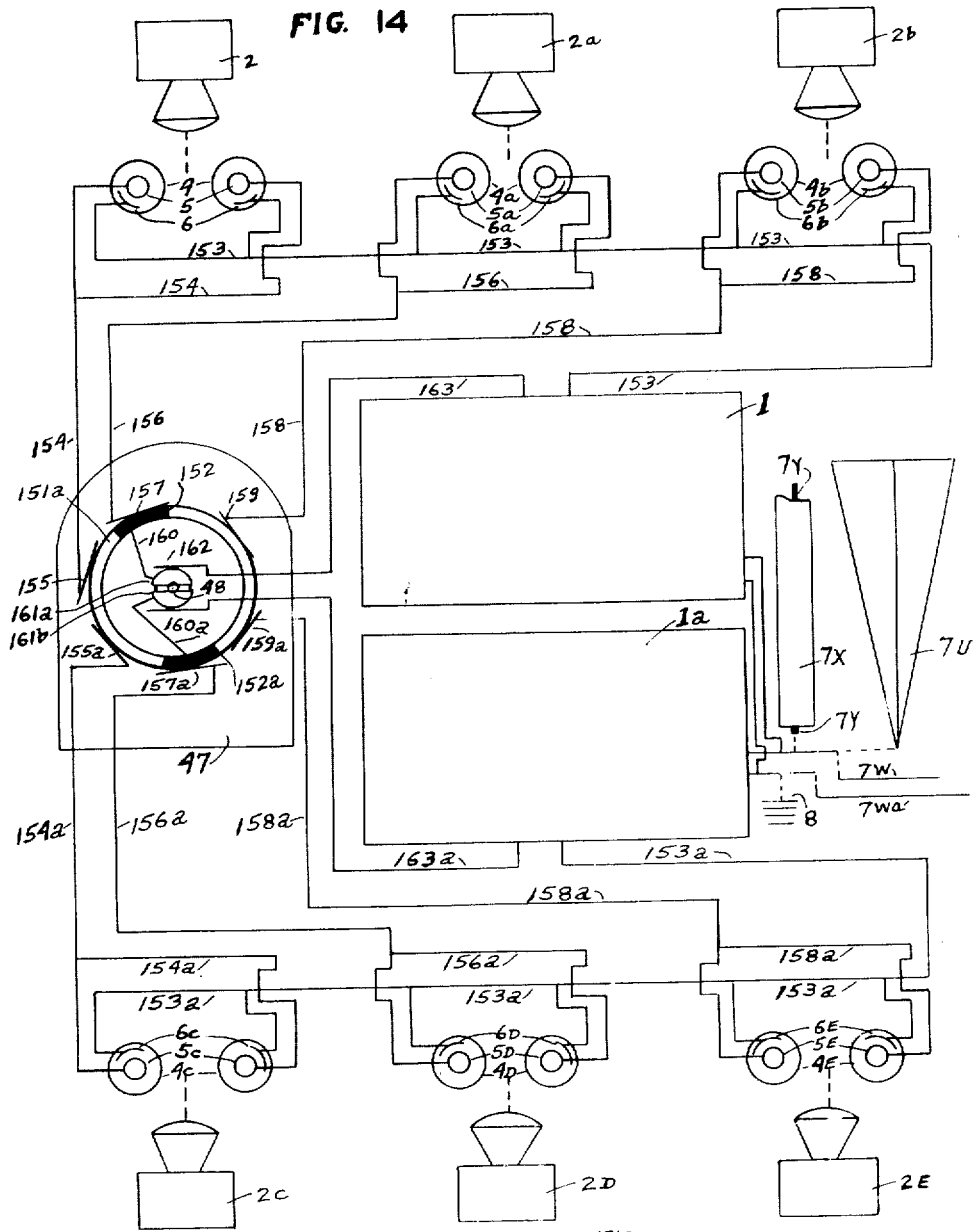
Figure 14 is a modification of Figure 12 using two transmitting stations in combination.

Figure 14 shows duplicate sending units and transmitters in a modification of Figure 12. The duplicated parts are indicated by like reference numerals with the letters "a" added to each; the rotating circuit control apparatus is in single unit but has duplicate brushes and circuits. The small metallic disc 161 of Figure 12 is split into two separate parts and insulated between as shown in Figure 14, indicated by 161a and 161b, for controlling separately the circuits to the respective transmitters as shown by the wiring. In the arrangement of the brush contacts the transmitters 1 and 1a will transmit simultaneously their images on different wave lengths, but it is an intent whenever desired to arrange the brushes by shifting in order to cause the transmitters to send their respective images alternately. The diameter of the disc and length of the contact segments are made to suit requirements and the sending time periods of each of the sending units are the same as the receiving apparatus. Optional output carrying means for transmitting to distances are shown, the same as in Figure 12 and other figures. Additional transmitters and units may be added by increasing the number of segments on the disc 151a and by other additional parts for making circuits through them. Furthermore, this type of apparatus as well as the single transmitter type shown in Figure 12 may be used simultaneously with one or more of the regular types of television transmitters or sending units as will be understood for various combinations. Also, sound transmissions may take place simultaneously with the image transmissions sent by the apparatus in Figure 14, as well as by apparatus in Figure 12.

Figure 15:
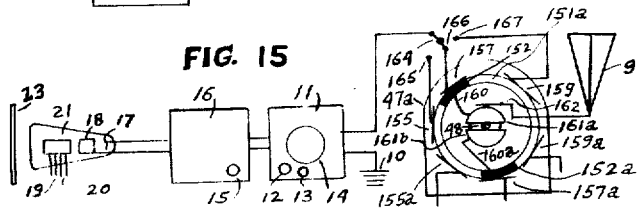
Figure 15 shows a receiving set with apparatus for receiving separately the images from the groupings in Figure 14.

Figure 15 shows the receiving set of Figure 13 without the added cathode ray tube 21a for photographing images, and with the same rotating apparatus 47a of Figure 14 having an aerial 9 connected to the brush 162 of the small disc 161a for leading to the carrier paths 160 and 152 to switch point 166 which is contacting the switch 164 leading to the input of the receiving set 11. A ground 10 is shown connected to the other input of the radio frequency stage 11, but it will be understood that other input carriers may be used as shown in Figure 2. The switch 164 is movable to contact the wiring terminals 165, 166 and 167 for selecting the scanning units 2, 2a and 2b, respectively of Figure 14, but the scanning units 2c, 2d and 2e may also be received when wiring terminals from brushes 155a, 157a and 159a lead to points in contact range of the switch 164 in Figure 15. Also, an additional receiving unit may be used in connection with the leads from the brushes 155a, 157a and 159a. Furthermore, the transmitter and its scanning units in Figure 12 may also be received by the apparatus in Figure 15 provided the rotating disc 151 of Figure 15 rotates at a speed for making contacts with the brushes in synchronism. The rotating disc 151 may be used for making and breaking the circuits of the television receiving set at any desired point.

Figure 16 is a modified arrangement for carrying out the transmission method described in reference to Figure 12 by arranging the images, one after the other along an endless film or other material for continuous operation. The endless strip 3M is threaded over sprocket rollers 168, 170, 172 and 174 having idle rollers 169, 171, 173 and 175, respectively, and passed through an apertured gate 85 hinged on an apertured guide plate 86. The scanning light source 2 projects its rays thru the images as they appear at the apertured gate and guide plate and are received by the photo-electric cell 4 shown connected to the input of the transmitter 1. The movement of the strip 3M is preferably intermittent for a period long enough to scan and transmit each of the images and such rotation may be accomplished by any suitable apparatus as well understood in the art. Also, in lieu of the rotating apparatus and sprocket arrangement described above, a moving picture projecting machine may be used and the gate 85 and guide plate 86 is representative of part of it. An electric motor, and a fly wheel on one of the sprocket-wheel shafts, serves to drive and stabilize either type of apparatus in a manner well known. When the images on 3M are printed or otherwise placed on paper it may be preferable to use plain rollers in lieu of the sprockets.

Figure 17 is a surface view of a section of film 3M showing how sound records may be added alongside of images 3Ma described for use with Figure 16. A separate transmitting channel is added when both records are sent simultaneously.

Figure 18 shows two sending stations sending simultaneously their respective images which are on a single endless strip 3N for carrying out the method of transmitting images as Figure 16, but in greater number. The strip 3N has the respective images for each sending unit alternated along its endless length and they may be alongside of each on a wide strip, or they may be on a narrower strip or film alternated and in single image width along the length. The added station and its parts are indicated by the same numerals as in Figure 16 with the letters "a" affixed to each.

An added sprocket 175 and idle roller 176 is shown between the two sending units, but the apparatus will move the strip or film 3N without the addition as in Figure 16. The transmissions are equivalent to Figure 14 except for the limitation of sending facsimile, however, the apparatus is much cheaper to construct than the Figure 14 and is preferable when facsimile alone is being sent. It will be understood that additional sending stations may be added and the film or strip may carry more separate sets of images alternated along its length in single image width, or a greater number of separate images alongside of each and alternated in alignment for beginning at different points. Also, the images may begin at the same starting points when a number of different sets are alongside of each.

Figure 19 shows two rows of images 3Na and 3Nb as described for use in Figure 18. Sound records are added as shown and they may be transmitted simultaneously with the images when such transmission channels are added. As many sound records may be added as there are images in separate rows.

Figure 20 shows a section of film 3N having alternated sets of images 3Na and 3Nb in lieu of having them side by side as shown in Figure 19. Sound records are added alongside of the records of the images. If desired, a greater number of separate sets of images may be alternated along the length with additional sound records. Alternating the separate sets of images makes possible high perfection in sound transmission with small sized images since, heretofore, it has been impossible to record and re-create small sized moving picture images and allow sufficient length to record and re-create all of the modulations of sound. One example of such difficulty is in the art of pure moving picture taking and projecting of the 16 millimeter width film which is considerably smaller in picture frame length than the professional size and accordingly shorter in length for the related sound records. The addition of one or more sets of moving picture images alternated along the running length provides additional length for the sound records and makes possible the same running speed, and even greater, than is now afforded in the professional type of moving pictures. Therefore, the invention of the picture and sound film in the Figure 20 has high novelty in the moving picture art as well as in the television transmitting art since high fidelity of sound re-creation is always given with the images on the receiveing or viewing screens. New uses for sound and picture films will be possible due to the reduced cost of making such small sized images with highly perfected sound recording and reproduction. It will be understood that both photographic and the mechanical types of sound records may be used along with the pictures. Also, all other types of sound records will be included as suitable for combination with the images in strip or film shape. It is not an intent to limit the pictures or images to small sizes since still further novelty and usefulness is afforded when they are of larger sizes since the sound record space increases in length and it is possible to excel the present type of professional sound films and records. Patent claims are made for these new records for all kinds of uses.

Figure 21 shows how images may be transmitted from a disc 102. In sending one row of images the results are the same as in Figures 12 and 16. When two rows of images are on a disc and a transmitting unit is provided for each row then the results are the same as in Figures 14 and 18. The rotating apparatus is enclosed in the casing 106 and the disc is held on its shaft 59s by a locking nut. The disc 102 is shown of thick material but it may be of paper, film and other materials. Also, if desired, it may be mounted on an apertured backing plate. While the disc in Figure 21 is shown in edge view and in part it will be understood that a greater or lesser number of images and rows may be used.

Figure 22 shows how sound records may be added to the images on a disc for transmitting images and sounds simultaneously by adding an additional sending channel to Figure 21. It will be understood that the images may be increased by increasing the diameter of the disc and more rows of images and sound records added. The disc is the equivalent to the endless records shown in Figures 16 and 18, depending on the number of sets of images thereon. When only one set of images it is equivalent to the results of Figure 16. When they are in two sets and alternated the results are equivalent to Figure 18. Also, when the images on the disc are in two separate rows they are equivalent to Figure 18. Likewise, the disc can be equivalent to the sound and image films shown in Figures 17, 19 and 20. The sounds may not be reproduced simultaneously with the images when not desired.

In lieu of photographing or otherwise recording sounds alongside of the images in Figures 17, 19, 20 and 22, they may be superimposed on the images, or the images may be superimposed on the sounds. Also, one of the two may be on opposite sides of the record material in order to reduce the width of the films and the diameter of the disc. Such methods of recording and reproducing are well known, it being accomplished by using the infra-red ray for one of the two in recording, and likewise in reproducing. A photoelectric cell responsive to such rays is used while the ordinary type is used for the visible light rays.

The films and disc shown in Figures 17, 18, 20 and 22, respectively, may be channeled out at the sound records and the records made in the channels to avoid wearing away by the constant wear when used over long periods. The images may also be registered in channels for such use. However, the channels are optional and depend on the type of guiding plates and apertures used in reproduction. Also, the films may be used in lengths without joining the ends as shown in Figures 17, 19 and 20. The endless film has particular advantage when the images are of a reasonable number. Also, the endless film is more desirable for short sound records.

The receiving apparatuses in Figures 13 and 15 will receive the separate images sent by the apparatuses in Figures 16, 18, and 21 when their rotating apparatus is at correct speed to synchronize with the rotation of the endless strips 3M and 3N, and the disc 102, respectively. However, reception may be without the rotating apparatus with a receiving set alone in some transmissions.

Figure 23 shows in side view a steady burning light source passing its rays through an optical system 92, then to a photographic sound record on the disc 102 for projecting to a light sensitive cell 4 having wiring connection to the input of a transmitting channel 30, shown in part view. This sending channel is additional to the image sending channel shown for the disc in Figure 41. Additional channels may be added when additional sound records are to be reproduced for transmitting.

The same sound transmitting apparatus as Figure 23 is used for transmitting sound records on the films 17, 19, and 20. More than one unit is used when two sound records are being transmitted from the films. The apparatus will be added by one, or between two, of any film sprocket rollers running at uniform or steady motion such as in Figures 16 and 18. The light sensitive cell and light source are housed to exclude light from other sources when there is conflict.

It will be understood that other methods of reproducing sounds may be used for all types of records than is shown in Figure 23. It is sometimes preferable to reflect light rays projected onto sound records to a light sensitive cell, as is understood in the art. Furthermore, mechanical, electro-magnetic and other kinds of reproductions are sometimes desired.

In transmitting images from the records in Figures 16, 18 and 21 it is preferable to include shutters for stopping the light rays passing to the light sensitive cells when the film rotating mechanism is of the intermitting type as is used in perfected moving picture machine apparatus. Likewise, it is preferable to use shutters between records of images in registering. Furthermore, it is preferable to use shutters and intermittent moving apparatus with apparatus shown in all of my drawings when the images are in motion except with apparatus where the transmissions are interrupted and increased.

When one set of records are shorter than another set then the starting may or may not be at or near the longer set. Furthermore, each of the rolls bearing records may have a blank end before and after records for use in threading onto reels as is common practice, or they may be without space.

A still further arrangement of records is in alternating a single set of images between each by running back from a stopping point, and, if desired, still further alternating between the same set of images may be carried out, particularly when greater recording speed is required for sound records running alongside in the same to and fro or reversed running directions. Such sound records are preferably in continuous joining by curved turning at each reversing point. Also, these records of images and sounds may be on separate materials. Furthermore, two or more different sets of images may be alternated between each in opposite running directions, and two or more different sound records may be parallel in opposite running directions, either with or separate from image records. Furthermore, two or more different sets of image records may be arranged side by side in opposite running order, particularly when they are of sufficient sizes to allow correct recording and reproducing speed for sound records running alongside.

A series of the same and different renditions may be along the same path in successive order for re-creating one after the other for carrying out my various methods set forth herein. Also, images and sound may be in successive order along the same running path, and each of the renditions may be different, or some may be in duplicate, triplicate and further repetition; also, each may be identical or duplication in successive order, as may be required. In fact, all kinds of arrangements may be made by combining the various types of records in lengthy series order, and they may be in a single path, or additional paths may be alongside. Furthermore, different renditions may run in opposite parallel directions as well as in opposite alternating to suit requirements in the various methods of transmitting and re-creating.

In making lengthy records of the types described it makes possible the operation of image and sound transmitting stations automatically, and the records will not require re-winding at each finish when another set or sets of different renditions are in opposite running thereon for immediate use or future use at the same or at other sending points. In such automatic uses the records or their rotating apparatus may automatically start and stop and one type of actuating apparatus is light sensitive cells in electric association with relays and switches for controlling a driving motor when markings or openings pass between the light sensitive cells and a source of light, the markings or openings being on the records.

My various types of records have many uses in addition to transmitting among which is direct moving picture projecting with and without sound; also, sound separate for many purposes.

Suitable recording and projecting apparatus is provided for making and re-creating alternated sets of images without interference by the intervening sets of images, one arrangement being intermittent rotating apparatus moving two or more image frames at an intermit but opening a shutter at only one picture frame. The other sets of images will be made in like manner by proper framing to the aperture plate and lens in correct running order.

Images may be arranged in either vertical or horizontal order along the running direction in all types of image records described.

Image and sound records on discs may be in spiral arrangement, or they may be in even circumferences thereon complete in each, and continuous from one record to another thereon when desired. Single circumference records are advantageous in repeating renditions.

Steady motion is applied to discs 102 shown in Figures 21 and 23 when sound is included with images. Therefore, the apparatus in casing 106 of Figure 21 is replaced by a motor when sound is on the disc with pictures, also, when sound alone is on the disc.

Since images may be transmitted with and without sounds in the methods of using apparatuses shown in the various drawings, likewise, the methods will also include the transmission and reception of sounds alone by repeating in the transmissions both by persons, records, and other means.

Furthermore, image and sound receptions may be registered together at a receiving station, also, one of the two may be registered without the other. A still further method is to reproduce sounds being sent while images are being registered, also, to view the images while sounds are being registered. In fact, it is possible to carry out several combinations of uses with my methods as will be understood. Suitable switches will be provided on all sending and receiving apparatus when methods of image and sound are optional in transmitting or receiving. My methods also include the sending of images from records in a similar recording to sounds in lieu of the full area and width images. Also, they may be recorded by suitable means at a receiving station. In viewing them in full image area suitable apparatus is provided to scan or otherwise project onto a viewing screen as they are being received, or from a record made in receiving and later re-created. Such records may supplement regular visible transmissions, or they may be in a group for sending alone. It may be found advantageous to send and receive only one of such records with other image and sound transmissions for uses set forth in the several drawings showing moving image records for transmitting purposes. The transmissions are carried out exactly as in the case of sound records being transmitted and drawings are not required.

My methods described and shown in the drawings may also include the sending and receiving of more than one component part of each image simultaneously by any of the known types of television scanners and other sending and receiving apparatuses. In such methods more than one sending and receiving channels are used.

Figure 24:
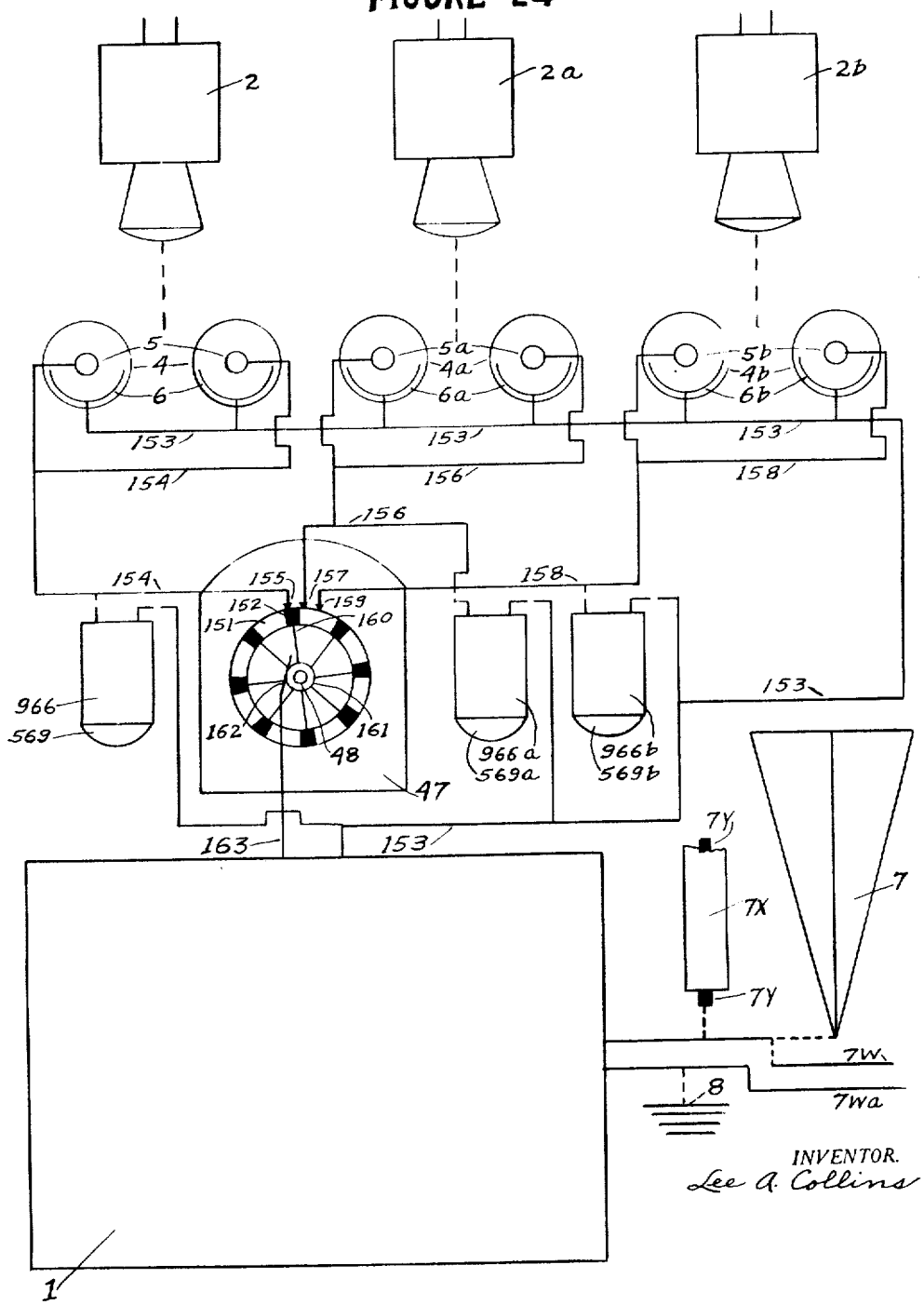
Figure 24 shows apparatus for successively scanning single lines of images and objects before completely scanning any one.

Figures 24 shows still further apparatus for scanning one or more lines of each image in successive order in lieu of completely scanning any one image before beginning the next image. It will be noted that the drawing is somewhat similar to Figure 12, the difference being an increased number of metallic segments 152 and leads 160 for the common rotating conductor 161 which has brush 162 contacting it for connecting to the input of the transmitter 1 through wire 163. In addition to this change in the Figure 12, there is shown three of the camera type scanners for optional use, but they are not joined to the wiring in Figure 24. The dotted lines indicate the connections when the scanners 966 are used, it being understood that the scanners 2, 2a, and 2b will not be used and will have their light sensitive cells 5, 5a, and 5b, disconnected or otherwise arranged to avoid variable current flow into the transmitters as has been explained in reference to other figures herein when other types of transmitting apparatuses are being substituted in changing the programs. It will be understood that a greater or lesser number of the metallic segments may be used, the number used depending on the number of brushes, sending units, and the diameter of the disc 151. While the apparatus in Figure 24 is substantially the same as in Figure 12, yet, the transmissions are altogether different since only part of any one image is scanned and then part of the next image or images is scanned. It will be understood that the apparatus is suitable for transmitting facsimile and all other objects. Furthermore, separate groups of images may be transmitted by the controlling motor 47 of the Figure 24 revolving an additional disc, or parts of a disc as shown in Figure 14, but having metallic segments in the arrangement and correct spacing as in Figure 24. No limitation is to be placed on the number of transmitting channels used in an assembly, and the metallic segments and leads may be arranged in any suitable way for controlling each of the transmitting channels in correct order and timing.

Since my method described in reference to Figure 24 transmits part of each image before completing any one image it may be termed in simple language as transmitting two or more images simultaneously.

In receiving images from my method of transmitting described in the above paragraph selecting apparatus may be used in like manner to Figures 13 and 15, but with the contact segments and other related parts corresponding to and in timing to those shown in Figure 24 and described in the modifications set forth in reference to this apparatus. However, reception is not limited to the selector with a receiver in receiving from Figure 24.

In addition to my method of transmitting described in Figure 24 it is an intent to transmit less than a single line, and less than two or more lines simultaneously with additional transmitting channels, of a single image or object and then likewise scan one or more succeeding images or objects before scanning any one image completely. It will be preferable in most uses to scan only one point of an image and then scan only one point of each of the succeeding images at relative positions before scanning in similar successive order each of the remaining points of the images or objects. The scanning order may be continuous over extended periods of time except when it is desired to interrupt for changing images or objects, and when used for registering the signal currents at distant points as described herein for the remote control of apparatus. Therefore, it is a purpose of the invention to interrupt at any time the sending of images and sound in this method and apparatus as well as with all other apparatuses shown and described. By arranging the contact segments 152 closer together and using more of them on the same sized disc 151 with less insulating material between them it is possible to send any desired part of a scanning line, the part being sent depending on the length of the contact segments around the diameter of the disc. However, the same number and size of contact segments on the same disc shown in Figure 24 may be used for sending less than a single line of each image, if the speed of the disc is great enough to shorten the time of contact with each of the brushes 155, 157 and 159. Likewise, the Figures 12 and 14 may be used for sending less than single scanning lines if the speed of their discs are still greater; also, they may be used for sending full scanning lines as in the method set forth for Figure 24 if the speed is adjusted to give the correct timing for contact of the segments and brushes. In other words, the size of the disc and the speed of rotation govern the length around the diameter for each of the contact segments and the number required. Also, more than one transmitting channel may be used with more than one disc, or with two or more parts of a disc arranged similar to the divided disc in Figure 14, or with other suitable modifications for carrying out the spirit of the invention. Identical arrangements of discs and their contact segments and brushes are preferable for use with a receiving set for receiving from the sending apparatus shown in Figure 24 and the modifications set forth above. Receiving sets will be connected to the brushes of the modified rotating disc as shown and described in reference to Figures 13 and 15. In transmitting a single scanning point successively of each of two or more images or objects it may prove highly advantageous in receiving on a visible screen any one of the group in this method since there is an equal image area and an equalized time period intervening between the transmitting of each image or object, whereas, the intervening time period between images transmitted in larger area, full line, or greater image area will be greater and a longer dark period will result between each on a receiving screen. However in registering images on a film or other material the larger and full image area scanning is preferable.

It is an intent to transmit sound, sound records, and television image records with my method and apparatus shown and described in reference to Figures 12, 14 and 24. Likewise, it is an intent to receive sound, sound records, and television records on a viewing screen; also, to record them, when desired, at receiving points with the receiving apparatus described in the paragraph above. In using the apparatuses in Figures 12, 14 and 24 it is an intent to replace the light sensitive cells 4, 4a and 4b with microphones or record reproducing apparatus for sound and record transmissions in lieu of the image transmissions. Switching arrangement may be provided for using either kind of transmissions, or either may be permanently connected if used for single kind of transmissions. A still further arrangement in combination transmitting is to replace one of the television sending units in Figures 12 or 24 with a sound microphone and another of the units with sound record reproducing apparatus, thus producing a triple type of transmission system over a single transmitter. By adding another sending unit with its wiring leading to the same transmitter by circuit through an additional brush to the contact segments, then television image records may be transmitted thus setting up a qudaruple transmission system over a single transmitter. The same methods may be carried out with more than one transmitter having additional circuit control brushes as shown in Figure 14 and in its modifications as described. The number of any one kind of the several types of transmission units will not be limited in an assembly using a single transmitting channel, or in using two or more transmitting channels as in the transmitting method and apparatus shown and described in reference to Figure 14. A still further combination is to use the different kinds of transmissions in grouped units with a separate transmitter for each, but with the revolving control disc arrangement shown in Figure 14, or with separate discs on the same driving shaft and with the output lead of each of the discs leading to their respective transmitters, or to other sending channels. It is apparent that many other combinations may be made to suit various requirements.

In transmitting sound with rotating disc circuit control apparatuses shown in Figures 12, 14 and 24 there will be interruption between words, sentences and other sounds unless the disc is slowed in speed to compensate for the respective sound transmissions, or the contact segments made longer around the circumference of a disc of suitable size. However, suitable timing may be effected for finishing the utterance, or reproduction of short records. One practical application of such sound transmissions is the pronunciation of words that appear in facsimile re-creation on a receiving screen, the sound being transmitted from one of the units in Figures 12, 14 or 24, while the facsimile is transmitted from another unit of either of the figures. Also, these figures may be used for the sending of the images of facsimile or objects of any kind with a separate sound channel without rotating disc circuit control means. Also, if necessary, more than one sound transmitting channel may be provided. However, in short sound transmissions of several kind supplementing facsimile or still object transmissions it is preferable to use the method of two or more transmitters controlled by rotating discs as shown in Figure 14 with one of the transmitters sending the images and the other one the sounds relating to them in order to give simultaneous reproduction. In using Figures 12 and 24 the images and related sounds will follow one another, and in this method it is an intent to sometime send only one image, or a single set of images on a disc of film, band of film, etc., arranged to repeat at the finish with one sound microphone, or record reproducing apparatus at the other sending unit for repeating the related sounds. And in the case of using records for the sounds they may be on the same material with the images, or they may be separate. In either case, in this method of using with the rotating disc with a single transmitting channel as in Figures 12 and 24, the sounds and images will be ahead of one another in the repeating, and it is possible to use a single radio-receiving set for both the images and the related sounds. The output of such a receiver will have connection to television receiving apparatus and to sound re-creating apparatus such as loud-speakers, etc. The sound waves in this case will re-create on the receiving screen following, or ahead of the image re-creations. Likewise, the image signals will re-create in the sound receiving apparatus in sounds ahead of, or following the regular sound desired for supplementing the images. Such reception costs less than with the selector apparatus shown and described in reference to receivers in Figures 13 and 15 and will prove satisfactory in some uses, and in other uses it will prove advantageous, among which uses is for deaf mutes and the blind. A deaf mute will see both the images and the sound records on the viewing screen while a blind person hears both the sounds and the image signals coming from a sound reproducer. Since deaf mutes can identify words and other sounds by their visible records, it is also possible for the blind to train their hearing sense to identify certain simple images such as the alphabet, and many objects and persons when the signal currents therefrom are made audible. Also, in addition, a person singing, speaking, etc., could have his name transmitted for reproducing on receiving screens and identification would be obtained by both the deaf mute and the blind.

In another method of transmitting sounds with the use of rotating discs shown in Figures 12, 14 and 24, the sounds may be lengthy and the discs driven at great speeds, thus giving contact of the brushes and the segments on the disc short timing, likewise, short timing between the two or more groups of sounds. This will give a minimum loss in transmissions of sounds and in the case of voice and signals they may prove understandable enough for many purposes, especially, for emergencies and where a shortage of sending channels exists. Among such uses is communication for military purposes with and without image transmissions, the reception being with apparatus for selecting as in Figures 13 and 15, but having sound speakers in lieu of television receiving tubes when sound is received.

In transmitting with apparatus shown in either of the Figures 12, 14 or 24, sounds may be sent with moving pictures, and with still and moving objects, or, either may be sent separate in suitable groupings. Likewise, recordings of television images, similar in appearance to sound records, may be sent separate, and in suitable combination. In fact, all of the uses set forth in all other types of apparatuses shown and described may be carried out in transmissions or sending.

My methods of using the various apparatuses shown and described in reference to Figures 12, 14, 16, 18, 21, and 24, inclusive, are many. In addition to the uses set forth short comic and short movie strips may be sent in consecutive order by arranging one still view at each of the sending units in Figures 12, 14, and 24, inclusive. In Figures 16, 18, and 21 they will be on the films or strips as already set forth. The most desirable use of such short strips is to repeat the transmissions of them over a lengthy period of time, or repeat them a sufficient number of times to enable receiving of an entire set at will during such periods. They may be with or without sound accompaniment by the several methods already set forth for more lengthy transmissions. The apparatus shown in each of the Figures 12, 14, and 24 is preferable for the short transmissions since each of the images will remain in absolute still position and the result will be more perfect images than obtainable with moving picture films in motion by mechanical apparatus. Since only one transmitting channel is required for any one set of still images transmitted in consecutive order in order to produce motion effect, with the proper timing between images, and no moving of the image bearing material, the methods and apparatuses set forth in each of the Figures 12, 14 and 24 have high novelty and usefulness for moving picture transmissions, and the transmission of objects and people posing in their respective positions in lieu of the still views at each of the sending units. It is also practical to transmit lengthy moving picture views and objects in like manner by providing a great number of the sending units, that is, one unit for each view or object. The expense of providing separate scanning units for each view or object will be prohibitive in using a great number, but equivalent scanning results may be obtained by the use of a large scanning disc, drum, prism, etc., having separate light sources for each of the light sensitive cell units, as will be understood. In the case of a scanning disc, drum, or mirror-disc or drum, with a single driving motor, there will be separate sets of scanning holes, with or without lenses at each hole, as shown for use in receiving images in Figures 5, 5a, and 6. One example in using is to employ a number of any one kind of such scanning equipment and scan several images or objects with each successively in order to accomplish moving picture effects with groups of still images or objects. Still another arrangement with such scanning equipment is to drive the entire grouping with a single motor with each of separate scanners with their spirals of holes, apertures, lenses, etc., in consecutive order for successively scanning. The reception of such moving pictures at receiving stations may be by any type of television apparatus without the use of the mechanical rotating selector discs and brushes shown in Figures 13 and 15 since each of the images are in successive order and related to each, and each one is to be received. The same arrangements may sometime be desirable for transmitting and receiving groups of unrelated images and objects in successive order. And the transmission periods of each may be varied, with or without intervals for images and objects, with or without sound. It can readily be seen that the above described methods are applicable to sending and receiving short distances apart, either by wired-circuit or radio, and it is also an intent to apply the invention to the showing of moving pictures in a theater or other buildings in lieu of using the moving picture projecting machine which has proven unsatisfactory due to its mechanical movement of the films. Such movement of the films causes flickers, tearing, scratching and other imperfections which retard in giving high perfection in the moving picture art. Since my invention overcomes these obstacles highly perfected images will be received on a viewing screen in a theater with the use of perfected television sending and receiving apparatus. It will be understood that the images may be on a single strip of material with any desired spacing between each, or separate material may be provided for each image with any desired spacing between; also, the images may be joined against each.

When images or objects to be transmitted are few in number it is sometimes preferable to use the rotating discs and their brushes in Figures 12, 14 and 24 for controlling the circuits of the scanners shown in lieu of the photo-electric cells shown. In this modification then a single, or two or more photo-electric cells, or other light sensitive electro-responsive cells may suffice for sending the entire group of images, and they will be in permanent connection to the transmitter, or to an amplifier, or wired circuits to a distant amplifier and receiving set, as will be understood. Likewise, the scanning apparatus circuits may be controlled for interrupting sending for remote control of receiving apparatus in lieu of interrupting the light sensitive cells.

It is also an intent to use rotating apparatus of the intermittent type housed in the casing 106 as described and shown in several of the figures in lieu of using a constantly rotating motor as described in reference to Figures 12, 13, 14, 15 and 24 for rotating the circuit control discs in each of these figures. The intermittingly rotating disc control mechanism is more applicable to Figures 12, 13, 14 and 15 when full image transmissions and receptions are given during the periods of each contact of a brush and segment of the disc, and especially when interruption is desirable between image sending for the remote control of receiving apparatus. Also, there may be occasions in sound transmissions when the intermittingly rotating apparatus is desirable. Therefore, either type of rotating apparatus may be used in order to meet existing conditions in sending and receiving. Furthermore, when desired for remote control of receiving apparatus, it is an intent to transmit a stronger current flow in using apparatuses in Figures 12, 14 and 24 at the finish of each separate transmission or suitable part thereof, in lieu of interrupting sending for remote control purposes.

In some uses of my apparatuses shown and described in reference to Figures 12, 14, 16, 18, 21 and 24, inclusive, it is an intent to transmit either images or sounds, or both simultaneously without repeating in order to enable receiving any part thereof as may be chosen during the known time of the sending. Such a method has particular value in sending different rolls of moving picture films at each of the sending units. It also has great value in sending different acts, speeches, etc., at each of the separate sending units without repeating for enabling receiving any desired part thereof during the known sending periods.

In using rolls of moving picture films at each sending unit without repeating it will also be understood that this method is applicable in Figure 1 and other figures having separate transmitting channels for each of the sending units. Also, separate acts, speeches, sound transmissions, etc., may be sent at each without repeating whenever desired in order to enable the receiving of any part thereof at the various receiving stations during the known sending periods.

While simultaneous sending of two or more images has been described in reference to a number of the figures herein either with one or more than one scanning line simultaneously, it will be understood that more than one scanning line may take place in sending and receiving, when desired, in all of the figures shown and described for simultaneous sending. Furthermore, a single scanning disc, drum, or other type of scanning apparatus may scan simultaneously each of the facsimile and other objects in lieu of using separate scanning apparatus as shown in the several figures. Such substitution has been described for Figures 12, 14 and 24, but it is applicable in the other figures showing two or more scanning units, and the several modifications set forth in reference to such scanning apparatus is applicable.

Since mechanical scanning discs, drums, prisms, etc., may be used for simultaneously scanning two or more images or objects, it will also be understood that they may be arranged to scan successively two or more images or objects in lieu of using two or more scanning units.

Either of my image transmitting systems shown may be used for similar methods of transmitting sounds by substituting the light sensitive cells shown with sound microphones, record reproducing apparatus, or both in combination, as has been described in reference to several of the figures. However, the light sensitive cells will not be substituted in the transmission of photographic sound records and records of television images made similar to sound records.

It will be understood that one or more light sensitive cells may be used and limitation is not to be placed on the number shown in any of the drawings. In small image transmissions a single light sensitive cell will suffice for each image, and in some transmissions one may suffice for two or more image transmissions. Also various other types of electro-responsive cells and the like may be used in lieu of the types shown in the several drawings.

My methods are not limited to the particular kind of radio receiving sets shown in the drawings. Neither is limitation placed on the types of cathode ray tubes and other receiving tubes shown with the receiving sets since all kinds are suitable in carrying out receiving by the several methods set forth.

X-ray tubes may be used in any of my methods of transmitting as scanning light sources when the interiors of opaque objects are to be sent to distant points for various purposes. Among the many uses is in receiving advice from surgeons at distant points concerning operations. It will be understood that several different views of the same person or other objects X-rayed may be transmitted simultaneously, or successively, as set forth for carrying out regular image transmissions.

Any suitable type of radio transmitters and other sending apparatus may be used in my methods. Either radio frequency or audio frequency may be used in transmissions. And in the reception thereof radio-frequency stages may be used for receiving radio-frequency radio, or wired waves, which are preferably passed on through an audio receiving stage for final receiving. The carrying channels are preferably for radio waves, but they are not to be limited for this method. However, the transmissions in my methods are primarily intended for radio wave transmissions through space.

When desired, my methods may be applied to transmitting and receiving colored images. Furthermore, a colored image, or objects may be sent, but received in single color. Also, any one kind of colors may be transmitted.

Suitable light excluding means may be provided for the various types of light sensitive cells and scanning apparatuses when extraneous light sources interfere.

Mirrors may be used for receiving and then reflecting images onto light sensitive cells after passing through or onto scanning apparatus. Also, mirrors may be used for receiving images and then reflecting onto the scanning tube type of image senders. However, mirrors are optional, but are sometimes useful.

When desired and when Government regulations may require it is an intent to change the wave length of one or more image or sound transmissions at any time after beginning.

In sending two or more transmissions simultaneously the starting and ending may be the same; also, different. Furthermore, they may be the same length programs or they may be of different lengths.

No limitation is to be placed on the number of metallic channels, or wired circuits, or a combination of circuits and other channels that any one image or sound transmission is sent over simultaneously. Also, no limitation is to be placed on the number of different wave lengths any one image or sound transmission is simultaneously sent. However, it will be understood that such uses are optional. And single transmitting channels may be used for each transmission in a group as has been described and shown in the drawings; also, in combination uses.

A single transmitting channel may be used when only one view, or image, or a roll of images, or a series of objects and scenes are to be transmitted repeatedly for various periods of time for enabling the reception thereof at various times to suit the convenience of the general public. Likewise, a single transmitting channel may be used when only one set of sound transmissions or programs are to be sent repeatedly.

The various methods of transmitting and receiving images and sound together, and separately, are not not limited to using the specific apparatuses shown and described.

It is an intent, whenever desired, to make various combinations of my methods, and suitable apparatuses for putting into effect, for various uses too numerous to mention.

Other means than shown and described may be used in my methods for sending two or more programs at a time over a single channel; also, in sending compete programs in close successive order for giving the equivalent result of sending simultaneously over a single channel. Among such additional means is sending separate transmissions simultaneously over a single channel by tuning forks actuated electrically by images and sound vibrations and arranged by a microphone, or several. Similar sets of different tuning forks will actuate by sound receiving reproducing apparatus and the forks will have microphonic control to image and sound receiving apparatuses. In lieu of the tuning forks being placed opposite microphones they may be a component part of a microphone in whole, or individually. In sound sending the microphonic fork transmitters may be used for direct pick-up.

Moving picture and sound records may be made together and separate in transmitting and then used for repeating transmissions immediately and later when desired, but it is optional with my methods.

When desired, my transmitting methods with apparatus may supplement printed newspapers, etc.

My methods and apparatuses have many other applications.

In the claims:

1. The method of broadcasting news and the like from a newspaper which consists of scanning and developing video signals from several pages simultaneously, transmitting the video signals from each page at a different frequency and selectively receiving signals from one of said pages on a single receiver.

2. The method of broadcasting news and the like from a newspaper which consists of scanning and developing video signals from several pages simultaneously and repeatedly, transmitting the video signals from each page at a different frequency and selectively receiving signals from one of said pages on a single receiver.

3. The method of broadcasting news from news pages which consists of developing video signals from several pages simultaneously, transmitting the video signals from each page a sufficient number of times for one or more broadcasts, and at different frequencies, and selectively receiving signals from one of said pages on a single receiver operating on one or more frequencies.

4. The method of broadcasting news from news pages which consists of developing and transmitting video signals from parts of several pages simultaneously at different frequencies and successively transmitting parts of several other pages simultaneously in close successive order and within the range of persistence of vision and at the frequencies of the preceding page transmissions and then successively transmitting the remaining parts of the several pages in like manner, then repeatedly transmitting all of the said operations, and selectively receiving signals from one of said pages on a single receiver.

5. The method of broadcasting news from news pages which consists of developing and transmitting video signals from parts of several pages simultaneously at different frequencies and successively transmitting parts of several other pages simultaneously in close successive order and at the frequencies of the preceding page transmissions then successively transmitting the remaining parts of the several pages in like manner and then repeating all of the said operations, and selectively receiving signals from one of said pages on a single receiver.

6. The method of broadcasting news and the like from news pages which consists of developing video signals from several pages simultaneously, transmitting the video signals from each page a sufficient number of times for one or more broadcasts and at different frequencies imposed on the same carrier medium, and selectively receiving signals from one of said pages on a single receiver operating on one or more frequencies.

7. The method of broadcasting news and the like from a news page which consists of simultaneously developing video signals from several compositions of a news page, transmitting the video signals from each composition a sufficient number of times for one or more broadcasts and at different frequencies over a desired carrier medium, and selectively receiving the signals from one of said compositions on a single receiver operating on one or more frequencies.

LEE A. COLLINS.